United States Patent
Kim

(10) Patent No.: US 11,317,114 B2
(45) Date of Patent: Apr. 26, 2022

(54) IMAGE PROCESSING APPARATUS AND IMAGE PROCESSING METHOD TO INCREASE ENCODING EFFICIENCY OF TWO-DIMENSIONAL IMAGE

(71) Applicant: SONY CORPORATION, Tokyo (JP)

(72) Inventor: Jongdae Kim, Tokyo (JP)

(73) Assignee: SONY CORPORATION, Tokyo (JP)

(*) Notice: Subject to any disclaimer, the term of this patent is extended or adjusted under 35 U.S.C. 154(b) by 0 days.

(21) Appl. No.: 16/979,660

(22) PCT Filed: Dec. 11, 2018

(86) PCT No.: PCT/JP2018/045458
§ 371 (c)(1),
(2) Date: Sep. 10, 2020

(87) PCT Pub. No.: WO2019/181101
PCT Pub. Date: Sep. 26, 2019

(65) Prior Publication Data
US 2021/0029377 A1    Jan. 28, 2021

(30) Foreign Application Priority Data
Mar. 19, 2018 (JP) .............................. JP2018-050903

(51) Int. Cl.
*H04N 11/02* (2006.01)
*H04N 19/563* (2014.01)
(Continued)

(52) U.S. Cl.
CPC ......... *H04N 19/563* (2014.11); *H04N 19/167* (2014.11); *H04N 19/176* (2014.11); *H04N 19/52* (2014.11); *H04N 19/597* (2014.11)

(58) Field of Classification Search
CPC .................................................. H04N 19/563
(Continued)

(56) References Cited

U.S. PATENT DOCUMENTS

| 2018/0249164 A1* | 8/2018 | Kim | H04N 19/174 |
| 2019/0005709 A1* | 1/2019 | Kim | H04N 19/117 |

(Continued)

FOREIGN PATENT DOCUMENTS

| JP | 2006-014174 A | 1/2006 |
| JP | 2008-510359 A | 4/2008 |

(Continued)

OTHER PUBLICATIONS

Choi, et al., "Text of ISO/IEC DIS 23090-2 Omnidirectional Media Format", ISO/IEC JTC1/SC29/WG11 N16824, International organisation for Standardisation, Coding of Moving Pictures and Audio, Apr. 2017, 62 pages.

(Continued)

*Primary Examiner* — Leron Beck
(74) *Attorney, Agent, or Firm* — Chip Law Group

(57) ABSTRACT

A padding processing section replaces, by using an input image which is a two-dimensional image in which plural fisheye images configuring a predetermined azimuth range are provided side by side, an image to be used in a prediction process outside a valid region of a fisheye image with an image at a corresponding position in a valid region of another fisheye image based on continuity of the plural fisheye images to reduce prediction errors. The padding processing section calculates the position in the valid region of the other fisheye image corresponding to the position outside the valid region based on fisheye image information indicative, for each fisheye image, of a center position, a fisheye radius, or a state of reversal or rotation of the fisheye image in the two-dimensional image. A reversible encoding section includes the fisheye image information into an encoded stream of the two-dimensional image.

16 Claims, 24 Drawing Sheets

(51) Int. Cl.
  *H04N 19/167* (2014.01)
  *H04N 19/176* (2014.01)
  *H04N 19/52* (2014.01)
  *H04N 19/597* (2014.01)

(58) Field of Classification Search
  USPC .................................. 375/240.01–240.29
  See application file for complete search history.

(56) References Cited

U.S. PATENT DOCUMENTS

| | | | |
|---|---|---|---|
| 2019/0166382 A1* | 5/2019 | He | H04N 19/186 |
| 2019/0199995 A1* | 6/2019 | Yip | G06T 3/60 |
| 2019/0200023 A1* | 6/2019 | Hanhart | H04N 19/184 |
| 2019/0215532 A1* | 7/2019 | He | H04N 13/117 |

FOREIGN PATENT DOCUMENTS

| | | |
|---|---|---|
| JP | 2016-042629 A | 3/2016 |
| JP | 2017-010082 A | 1/2017 |
| JP | 2018-521539 A | 8/2018 |
| TW | 201803354 A | 1/2018 |
| WO | 2016/183216 A1 | 11/2016 |
| WO | 2017/204185 A1 | 11/2017 |

OTHER PUBLICATIONS

International Search Report and Written Opinion of PCT Application No. PCT/JP2018/045458, dated Feb. 26, 2019, 09 pages of ISRWO.

\* cited by examiner

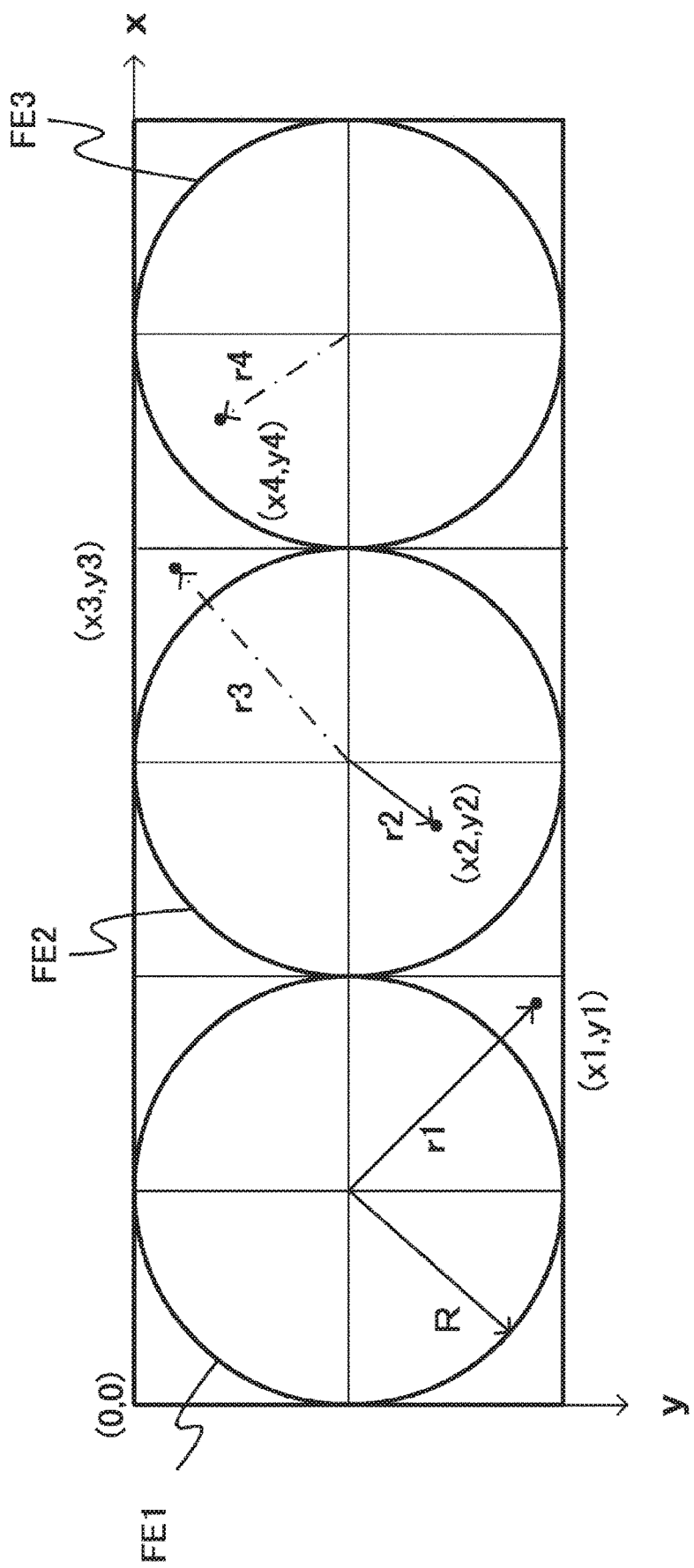

IMAGE PROCESSING APPARATUS AND IMAGE PROCESSING METHOD TO INCREASE ENCODING EFFICIENCY OF TWO-DIMENSIONAL IMAGE

CROSS REFERENCE TO RELATED APPLICATIONS

This application is a U.S. National Phase of International Patent Application No. PCT/JP2018/045458 filed on Dec. 11, 2018, which claims priority benefit of Japanese Patent Application No. JP 2018-050903 filed in the Japan Patent Office on Mar. 19, 2018. Each of the above-referenced applications is hereby incorporated herein by reference in its entirety.

TECHNICAL FIELD

The present technology relates to an image processing apparatus and an image processing method.

BACKGROUND ART

Conventionally, a technology is disclosed in PTL 1 in which, in an imaging system for imaging all directions of 360°, an omnidirectional image is encoded efficiently without performing such a process as interpolation for an image and without allowing a seam to stand out. Further, in PTL 2, motion prediction and compensation of a panorama video are performed utilizing a spatial correlation between a right side boundary portion and a left side boundary portion of a panorama video including all directions of 360°. Further, in NPL 1, it is described that, in the case where a fisheye image of a view angle of 180° or more in a gaze direction and another fisheye image of a view angle of 180° or more in the opposite direction to the gaze direction are acquired to obtain an omnidirectional still image, an image process such as splicing of the fisheye images is performed and a resulting image is converted, for example, into an equirectangular cylinder image and then encoded and recorded. Further, it is described that, in the case where an omnidirectional moving image is to be obtained, splicing, a conversion process into an equirectangular image and so forth are not performed in a system but plural acquired fisheye images are arranged side by side on a two-dimensional plane and then an image in which the fisheye images are arranged side by side is encoded and recorded by a conventional encoding technology.

CITATION LIST

Patent Literature

[PTL 1]
JP 2008-510359A
[PTL 2]
JP 2006-014174A

Non Patent Literature

[NPL 1]
Text of ISO/IEC DIS 23090-2 Omnidirectional Media Format. ISO/IEC JTC1/SC29/WG11 N16824.

SUMMARY

Technical Problems

Incidentally, a plurality of fisheye images is not used in PTL 1 and PTL 2. Further, if circular fisheye images are arranged side by side on a two-dimensional plane as in NPL 1, then an invalid region exists outside the circumference. Therefore, in the case of intra prediction in the proximity of a circumference, since a prediction image is produced from the invalid region, there is the possibility that the encoding efficiency in the proximity of the circumference may degrade. Also in inter prediction, since a region capable of being used for search for a motion vector is limited in the proximity of a circumference of the fisheye image, the encoding efficiency decreases.

Therefore, the present technology provides an image processing apparatus and an image processing method in which the encoding efficiency of a two-dimensional image in which plural fisheye images configuring a predetermined azimuth range are provided and arranged side by side can be increased.

Solution to Problems

The first aspect of the present technology resides in
an image processing apparatus including
a padding processing section configured to perform, by using a two-dimensional image in which plural fisheye images configuring a predetermined azimuth range are provided side by side, a padding process of replacing an image at a position outside a valid region of a fisheye image with an image at a corresponding position in a valid region of another fisheye image on the basis of continuity of the plural fisheye images.

In the present technology, the padding processing section performs, by using a two-dimensional image in which plural fisheye images configuring a predetermined azimuth range, for example, 360 degrees in all directions are provided side by side, a padding process of replacing, for example, an image at a position to be used in a prediction process outside a valid region of a fisheye image with an image at a corresponding position in a valid region of another fisheye image on the basis of the continuity of the plural fisheye images. The valid region of the fisheye image is a region within a fisheye radius, and the padding processing section calculates a position within a valid region of another fisheye image corresponding to a position outside the valid region according to a fisheye radius, an arrangement state of the plurality of fisheye images, or reversal or rotation for each fisheye image. Further, in the case where each of a plurality of fisheye images includes the corresponding position in the valid region thereof, the padding processing section performs replacement using an image of a fisheye image in which a distance from a fisheye center of the fisheye image that includes the corresponding position in the valid region thereof to a position outside the valid region for which the padding process is to be performed is shortest.

The image processing apparatus further includes an encoding section configured to perform a prediction encoding process of the two-dimensional image to generate an encoded stream, and the encoding section performs the prediction encoding process using the two-dimensional image for which the padding process has been performed. For example, the encoding section performs a quantization process and a prediction process using the two-dimensional image for which the padding process has been performed. Alternatively, the padding process before the prediction encoding process may be performed for an image that is an adjacent block of an intra prediction process outside the valid region of the fisheye image or an image that is a search range for a motion vector in an inter prediction process. Further, the encoding section may perform a prediction process using the two-dimensional image before the padding process is performed and the padding processing section may perform the padding process when an image of an adjacent block to a block for which the intra prediction process is to be performed or an image within a search range for a motion vector in a block for which the inter prediction process is to be performed is outside the valid region. The encoding section includes fisheye image information indicative, for each fisheye image, of a center position, a fisheye radius, and a state of reversal or rotation of the fisheye image in the two-dimensional image into an encoded stream.

The image processing apparatus further includes a decoding section configured to decode an encoded stream generated by performing a prediction encoding process of the two-dimensional image, and the decoding section replaces, in the case where an image to be used in the prediction process, that is, an image of an adjacent block to a block for which the intra prediction process is to be performed or an image of a reference block based on motion vector information of a block for which motion compensation is to be performed and reference frame information is at a position outside the valid region, the image to be used for the prediction process into a decoded image at a corresponding position in the valid region of the another fisheye image. The decoding section calculates the corresponding position in the valid region of the another fisheye image on the basis of fisheye image information obtained by decoding the encoded stream. Further, the decoding section replaces an image outside of the valid region of the fisheye image in the two-dimensional image after decoding with an invalid image.

The second aspect of the present technology resides in an image processing method including replacing in a padding processing section, by using a two-dimensional image in which plural fisheye images configuring a predetermined azimuth range are provided side by side, an image at a position outside a valid region of a fisheye image with an image at a corresponding position in a valid region of another fisheye image on the basis of continuity of the plural fisheye images.

Advantageous Effects of Invention

With the present technology, a padding process of replacing, by using a two-dimensional image in which plural fisheye images configuring a predetermined azimuth range are provided side by side, an image at a position outside a valid region of a fisheye image with an image at a corresponding position in a valid region of another fisheye image on the basis of continuity of the plural fisheye images. Accordingly, even if an image to be used in prediction is at a position outside the valid region, it is replaced with an image at a corresponding position in the valid region. Thus, the encoding efficiency of a two-dimensional image in which plural fisheye images are provided side by side can be increased. It is to be noted that the advantageous effects described in the present specification are exemplary to the end and are not restrictive, and some other additional effects may be applied.

BRIEF DESCRIPTION OF DRAWINGS

FIG. 22 is a view depicting a case in which three fisheye images are arranged continuously side by side in the horizontal direction.

DESCRIPTION OF EMBODIMENTS

In the following, modes for carrying out the present technology are described. If fisheye images are arranged on a two-dimensional plane, then in a rectangular region that circumscribes each fisheye image (or includes the entire fisheye image), an invalid region having no image exists outside a valid region indicative of the fisheye image. Therefore, in the present technology, a padding process of replacing an image outside a valid region with an image at a corresponding position in a valid region of another fisheye image is performed such that, in intra prediction and inter prediction, even if the position of an image to be used in the prediction is outside a valid region, an image in the valid region can be used to make it possible to perform a prediction encoding process having a high encoding efficiency even if a fisheye image is applied. It is to be noted that the description is given in the following order.

Figure 1:
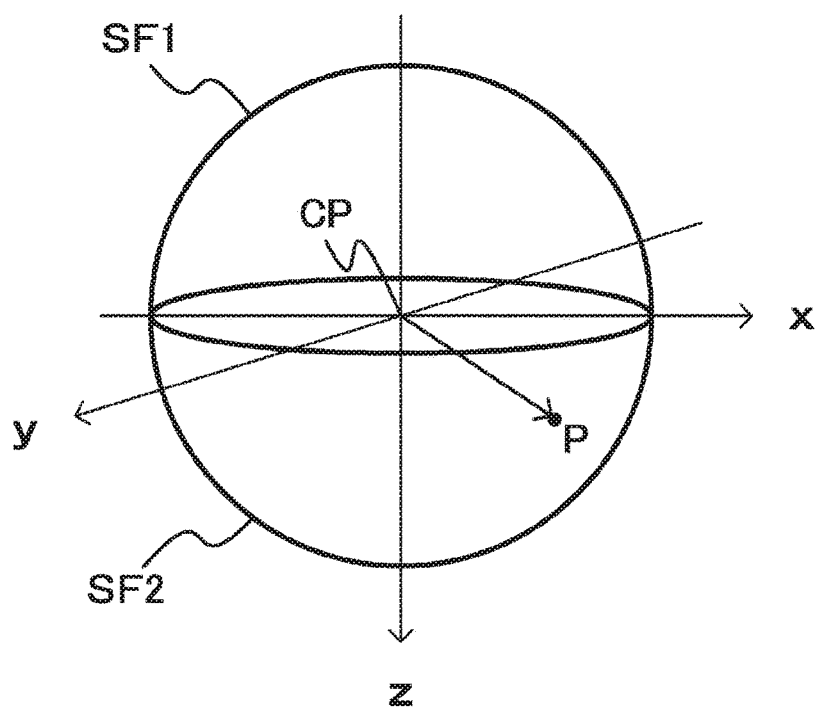
FIG. 1 is a view illustrating a plurality of fisheye images configuring all directions of 360°.

1. Plural Fisheye Images and Padding Process
2. Image Processing apparatus
  2-1. First Embodiment of Image Encoding Apparatus
    2-1-1. Configuration of First Embodiment
    26-1-2. Operation of First Embodiment
    2-1-3. Another Operation of First Embodiment
    2-1-4. Example of Operation of Intra Prediction and Inter Prediction
  2-2. Second Embodiment of Image Encoding Apparatus
    2-2-1. Configuration of Second Embodiment
    2-2-2. Operation of Second Embodiment
  2-3. Image Decoding Apparatus
    2-3-1. Configuration of Embodiment
    2-3-2. Operation of Embodiment
3. Modification of Padding Process
4. Application Example 1. Plural Fisheye Images and Padding Process FIG. 1 is a view illustrating a plurality of fisheye images configuring 360 degrees in all directions. For example, a virtual sphere is provided with reference to a position CP. Here, if an image sensor that uses a fisheye lens captures a fisheye image indicative of an upper side hemisphere SF1 with respect to an x-y plane and another fisheye image indicative of a lower side hemisphere SF2 with respect to the x-y plane, then the two fisheye images configure 360 degrees in all directions.

Figure 2:
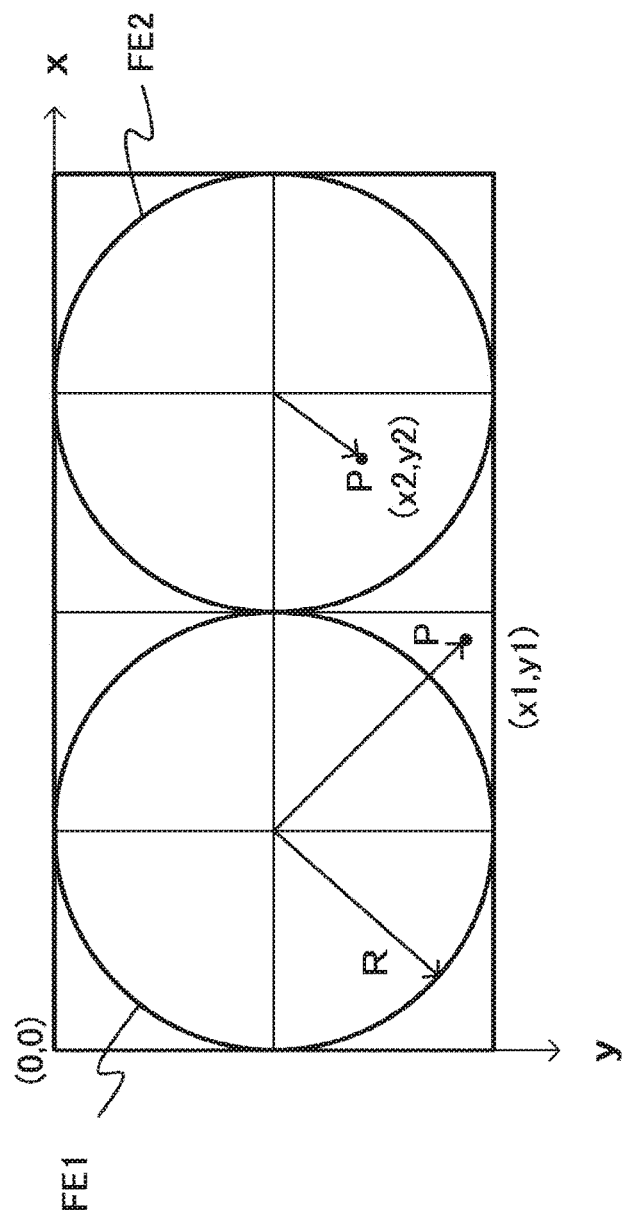
FIG. 2 is a view illustrating continuity of two fisheye images configuring all directions of 360°.

FIG. 2 is a view illustrating continuity of two fisheye images configuring 360 degrees in all directions. A fisheye image FE1 on the left side in FIG. 2 is an image obtained by developing a fisheye image indicative of the upper side hemisphere SF1 of FIG. 1 on a two-dimensional plane. A fisheye image FE2 on the right side in FIG. 2 is an image obtained by developing a fisheye image indicative of the lower side hemisphere SF2 of FIG. 1 on the two-dimensional plane. It is to be noted that the fisheye image FE1 and the fisheye image FE2 are generated such that they are equal in fisheye radius R to each other. Further, in the present technology, the region in the fisheye radius is a valid region of the fisheye image.

If it is assumed that a position P outside the valid region of the fisheye image FE1 is included in the valid region of the fisheye image FE2 and the position P is a position (x1, y1) indicated by coordinates, then the position (x1, y1) corresponds to a position (x2, y2). Accordingly, an image outside the valid region of the fisheye image FE1 is padded using an image at a corresponding position in the valid region of the fisheye image FE2. It is to be noted that a position outside a valid region that is a padding target is referred to also as a padding point.

Figure 3:
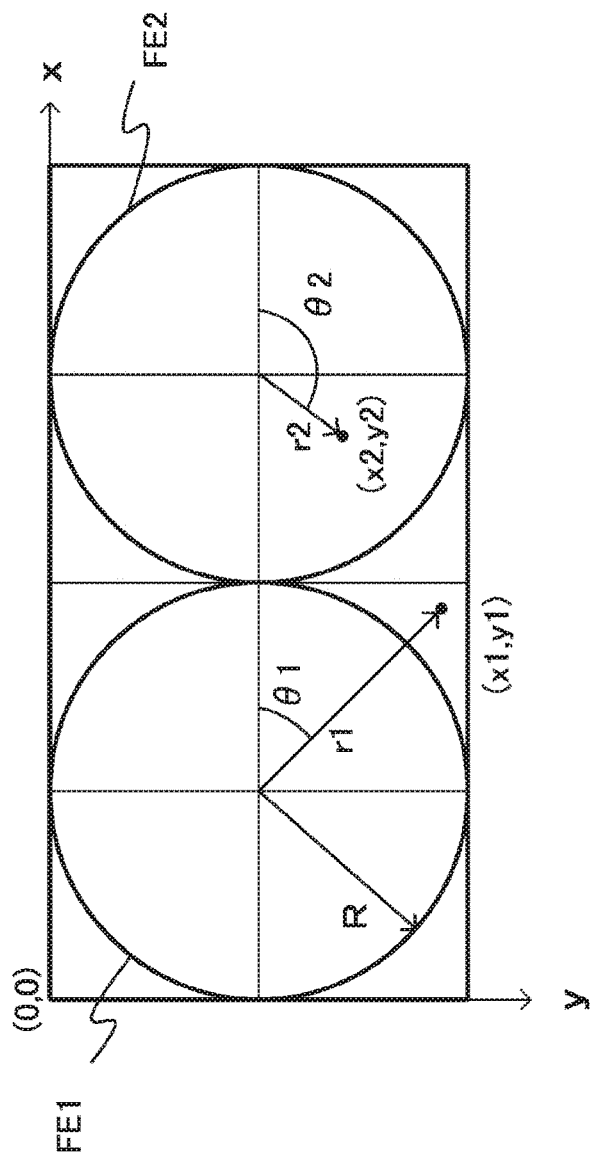
FIG. 3 is a view illustrating a procedure of a padding process.

Now, a procedure of a padding process is described with reference to FIG. 3. It is to be noted that, in FIG. 3 and images hereinafter described in which a plurality of fisheye images is continuous, the left upper is made a reference (0, 0).

In a procedure 1, polar coordinates (r1, θ1) of the position (x1, y1) outside the valid region of the fisheye image FE1 is calculated. An expression (1) indicates a calculation formula of the radius r1 of the polar coordinates, and an expression (2) indicates a calculation formula of a declination θ1.

[Math. 1]

$$r1 = \sqrt{(x1-R)^2 + (y1-R)^2} \quad (1)$$

$$\theta 1 = \cos^{-1}((x1-R)/r1) \quad (2)$$

In a procedure 2, on the basis of the radius r1 calculated by the procedure 1, a radius r2 of the position (x2, y2) corresponding to the position (x1, y1) is calculated. An expression (3) indicates a calculation formula of the radius r2 of the coordinates (x2, y2).

$$r2 = 2R - r1 \quad (3)$$

In a procedure 3, on the basis of the declination θ1 calculated by the procedure 1, a declination θ2 of the position (x2, y2) corresponding to the position (x1, y1) is calculated. An expression (4) indicates a calculation formula of the declination θ2 of the coordinates (x2, y2).

$$\theta 2 = \pi - \theta 1 \quad (4)$$

In a procedure 4, the polar coordinates of the position (x2, y2) are converted into orthogonal coordinates. The diameter and the declination of the polar coordinates indicative of the position (x2, y2) have been calculated by the procedure 2 and the procedure 3. Accordingly, in the procedure 4, an expression (5) and an expression (6) are used to calculate orthogonal coordinates of the position (x2, y2).

$$x2 = r2 \cos(\theta 2) + 3R \quad (5)$$

$$y2 = r2 \sin(\theta 2) + R \quad (6)$$

In a procedure 5, the image at the position (x1, y1) is replaced with the image at the position (x2, y2).

If such processes as described above are performed, then it is possible to perform a padding process by replacing an image outside the valid region of the fisheye image FE1 with an image in the valid region of the fisheye image FE2.

2. Image Processing Apparatus

In an image processing apparatus, a prediction encoding process of a plurality of fisheye images configuring a predetermined azimuth range or a decoding process of an encoded stream generated by this prediction encoding process is performed. The image encoding apparatus that performs the prediction encoding process improves the encoding efficiency by using a padding process of replacing an image outside a valid region of a fisheye image with an image within a valid region of another fisheye image. Meanwhile, the image decoding apparatus that performs the prediction encoding process performs a decoding process of an encoded stream generated by a prediction encoding process using a padding process to generate a plurality of fisheye images configuring a predetermined azimuth range.

2-1. First Embodiment of Image Encoding Apparatus 2-1-1. Configuration of First Embodiment FIG. 4 exemplifies a configuration of a first embodiment of the image encoding apparatus. An image encoding apparatus 10 performs encoding of image data using a prediction process to generate an encoded stream that complies with, for example, the H265./HEVC standard.

The image encoding apparatus 10 includes a padding processing section 21, a screen rearrangement buffer 22, a calculation section 23, an orthogonal transform section 24, a quantization section 25, a reversible encoding section 26, an accumulation buffer 27, and a rate controlling section 28. The image encoding apparatus 10 further includes a dequantization section 31, an inverse orthogonal transform section 32, a calculation section 33, a deblocking filter 34, an SAO (Sample Adaptive Offset) filter 35, a frame memory 36, and a selection section 37. Furthermore, the image encoding apparatus 10 includes an intra prediction section 41, an inter prediction section 42, and a prediction selection section 43. It is to be noted that the encoding section corresponds to the screen rearrangement buffer 22 to the prediction selection section 43.

A two-dimensional image in which plural fisheye images acquired from plural image sensors and configuring a predetermined azimuth range, for example, 360 degrees in all directions, are provided side by side is inputted as an input image to the padding processing section 21. In the two-dimensional image, regions other than valid regions of the fisheye images form an invalid image (for example, a monochromatic image). Fisheye image information relating to the fisheye images provided in the two-dimensional image is inputted to the padding processing section 21 and the reversible encoding section 26. The fisheye image information indicates, for each fisheye image, the position of the center, fisheye radius R, rotation, reversal information and so forth of the fisheye image in the two-dimensional image. The fisheye image information may further include, syntax elements (for example, information of a scale, an angle of view, a direction of a camera and so forth) indicated by "JCTVC-AB0032 Omnidirectional fisheye video SEI message" in regard to which standardization is being progressed by JCT-VC (Joint Collaboration Team—Video Coding) that is a standardization organization, position information indicative of a position at which the fisheye image is acquired and like information.

The padding processing section 21 uses the input image to perform, on the basis of the fisheye image information, a padding process of replacing, on the basis of continuity of a plurality of fisheye images, an image at a position outside of a valid region of a fisheye image with an image at a corresponding position in a valid region of another fisheye image. It is to be noted that a valid region is a region in a fisheye radius. The padding processing section 21 outputs the image after the padding process to the screen rearrangement buffer 22.

The screen rearrangement buffer 22 stores images supplied from the padding processing section 21 and rearranges the stored frame images from a displaying order into an order for encoding (encoding order) according to a GOP (Group of Picture) structure. The screen rearrangement buffer 22 outputs image data (original image data) of the frame images having the encoding order to the calculation section 23. Further, the screen rearrangement buffer 22 outputs the original image data to the SAO filter 35, the intra prediction section 41, and the inter prediction section 42.

The calculation section 23 subtracts, for each pixel, prediction image data supplied from the intra prediction section 41 or the inter prediction section 42 through the prediction selection section 43 from the original image data supplied from the screen rearrangement buffer 22 to obtain residual data indicative of prediction residuals and outputs the residual data to the orthogonal transform section 24.

For example, in the case of an image for which intra encoding is to be performed, the calculation section 23 subtracts the prediction image data generated by the intra prediction section 41 from the original image data. On the other hand, in the case of an image for which inter encoding is to be performed, the calculation section 23 subtracts the prediction image data generated by the inter prediction section 42 from the original image data.

The orthogonal transform section 24 performs an orthogonal transform process for residual data supplied from the calculation section 23. For example, the orthogonal transform section 24 performs, for each of one or more TUs set in each CTU (Coding Tree Unit), orthogonal transform such as discrete cosine transform, discrete sine transform, or Karhunen-Loeve transform. The orthogonal transform section 24 outputs transform coefficients of a frequency region obtained by performing the orthogonal transform process to the quantization section 25.

The quantization section 25 quantizes the transform coefficients outputted from the orthogonal transform section 24. The quantization section 25 outputs the quantization data of the transform coefficients to the reversible encoding section 26. Further, the quantization section 25 outputs the generated quantization data also to the dequantization section 31.

The reversible encoding section 26 performs a reversible encoding process for the quantization data inputted from the quantization section 25 for each CTU, for example, a reversible encoding process of CABAC (Context-Adaptive Binary Arithmetic Coding). Further, the reversible encoding section 26 acquires parameters of a prediction mode selected by the prediction selection section 43, for example, parameters of information indicative of an intra prediction mode or the like or parameters of information indicative of an inter prediction mode and motion vector information. Furthermore, the reversible encoding section 26 acquires parameters relating to a filter process from the SAO filter 35 hereinafter described. Further, the reversible encoding section 26 acquires block information indicative of in what manner a CTU, a CU, a TU, and a PU are to be set to an image. The reversible encoding section 26 encodes the quantization data and accumulates the acquired parameters relating to an encoding process as syntax elements of the H.265/HEVC standard and as part of header information for an encoded stream into the accumulation buffer 27. Further, the reversible encoding section 26 includes fisheye image information inputted to the image encoding apparatus 10 as a syntax element of an encoded stream or as SEI (Supplemental Enhancement Information) that is additional information into the encoded stream.

The accumulation buffer 27 temporarily retains data supplied from the reversible encoding section 26 and outputs the data as an encoded image that is encoded or outputted as an encoded stream, for example, to a recording apparatus or a transmission line not depicted in a succeeding stage at a predetermined timing.

The rate controlling section 28 controls the rate of quantization operation of the quantization section 25 on the basis of compressed images accumulated in the accumulation buffer 27 such that no overflow or no underflow may occur.

The dequantization section 31 dequantizes quantization data of transform coefficients supplied from the quantization section 25 by a method corresponding to that of the quantization performed by the quantization section 25. The dequantization section 31 outputs the resulting dequantization data to the inverse orthogonal transform section 32.

The inverse orthogonal transform section 32 performs inverse orthogonal transform of dequantized data supplied thereto by a method corresponding to that of the orthogonal transform process performed by the orthogonal transform section 24. The inverse orthogonal transform section 32 outputs a result of the inverse orthogonal transform, namely, restored residual data, to the calculation section 33.

The calculation section 33 adds prediction image data supplied from the intra prediction section 41 or the inter prediction section 42 through the prediction selection section 43 to residual data supplied from the inverse orthogonal transform section 32 to obtain a locally decoded image (decoded image). For example, in the case where the residual data corresponds to an image for which intra encoding is to be performed, the calculation section 33 adds the prediction image data supplied from the intra prediction section 41 to the residual data. On the other hand, for example, in the case where the residual data corresponds to an image for which inter encoding is to be performed, the calculation section 33 adds the prediction image data supplied from the inter prediction section 42 to the residual data. The decoded image data that is a result of the addition is outputted to the deblocking filter 34. Further, the decode image data is outputted as reference image data to the frame memory 36.

The deblocking filter 34 suitably performs a deblocking process to remove block distortion of decoded image data. The deblocking filter 34 outputs a result of the filter process to the SAO filter 35.

The SAO filter 35 performs an adaptive offset filter process (also called SAO (Sample Adaptive Offset) process) for the decoded image data after the filter by the deblocking filter 34. The SAO filter 35 outputs an image after the SAO process to the frame memory 36.

The reference image data accumulated in the frame memory 36 is outputted to the intra prediction section 41 or the inter prediction section 42 through the selection section 37 at a predetermined timing. For example, in the case of an image for which intra encoding is to be performed, reference image data for which a filter process by the deblocking filter 34 or the like is not performed is read out from the frame memory 36 and outputted to the intra prediction section 41 through the selection section 37. On the other hand, for example, in the case where inter encoding is to be performed, reference image data for which a filter process by the deblocking filter 34 or the like is performed is read out from the frame memory 36 and outputted to the inter prediction section 42 through the selection section 37.

The intra prediction section 41 executes an intra prediction process for each of one or more PUs set in each CTU on the basis of original image data and decoded image data. A PU can be divided into one or more TUs. For example, the intra prediction section 41 evaluates a cost function value based on a prediction error and a code amount to be generated for each of prediction mode candidates specified by H.265/HEVC. Then, the intra prediction section 41 selects a prediction mode by which the cost function value becomes in the minimum, namely, a prediction mode by which the compression ratio becomes highest, as an optimum prediction mode. Further, the intra prediction section 41 generates prediction image data in accordance with the selected optimum prediction mode. Then, the intra prediction section 41 outputs information relating to intra prediction including prediction mode information indicative of the optimum prediction mode, the corresponding cost function value, and prediction image data to the prediction selection section 43.

The inter prediction section 42 executes an inter prediction process (motion detection and motion compensation) for each of one or more PUs set in each CTU on the basis of original image data and decoded image data. For example, the inter prediction section 42 evaluates a cost function value based on a prediction error and the code amount to be generated for each of prediction mode candidates included in the search range for a motion vector specified by H.265/HEVC. Then, the inter prediction section 42 selects a prediction mode that indicates the lowest cost function value, namely, a prediction mode by which the compression ratio becomes highest, as an optimum prediction mode. Further, the inter prediction section 42 generates prediction image data in accordance with the selected optimum prediction mode. Then, the inter prediction section 42 outputs the information relating inter prediction, the corresponding cost function value, and prediction image data to the prediction selection section 43.

The prediction selection section 43 sets a prediction mode for each of CTUs or CUs on the basis comparison of cost function values inputted from the intra prediction section 41 and the inter prediction section 42. In regard to a block for which the intra prediction mode is set, the prediction selection section 43 outputs prediction image data generated by the intra prediction section 41 to the calculation sections 23 and 33 and outputs information relating to intra prediction to the reversible encoding section 26. Meanwhile, in regard to a block for which the inter prediction mode is set, the prediction selection section 43 outputs prediction image data generated by the inter prediction section 42 to the calculation sections 23 and 33 and outputs information relating to inter prediction to the reversible encoding section 26.

2-1-2. Operation of First Embodiment

Figure 5:
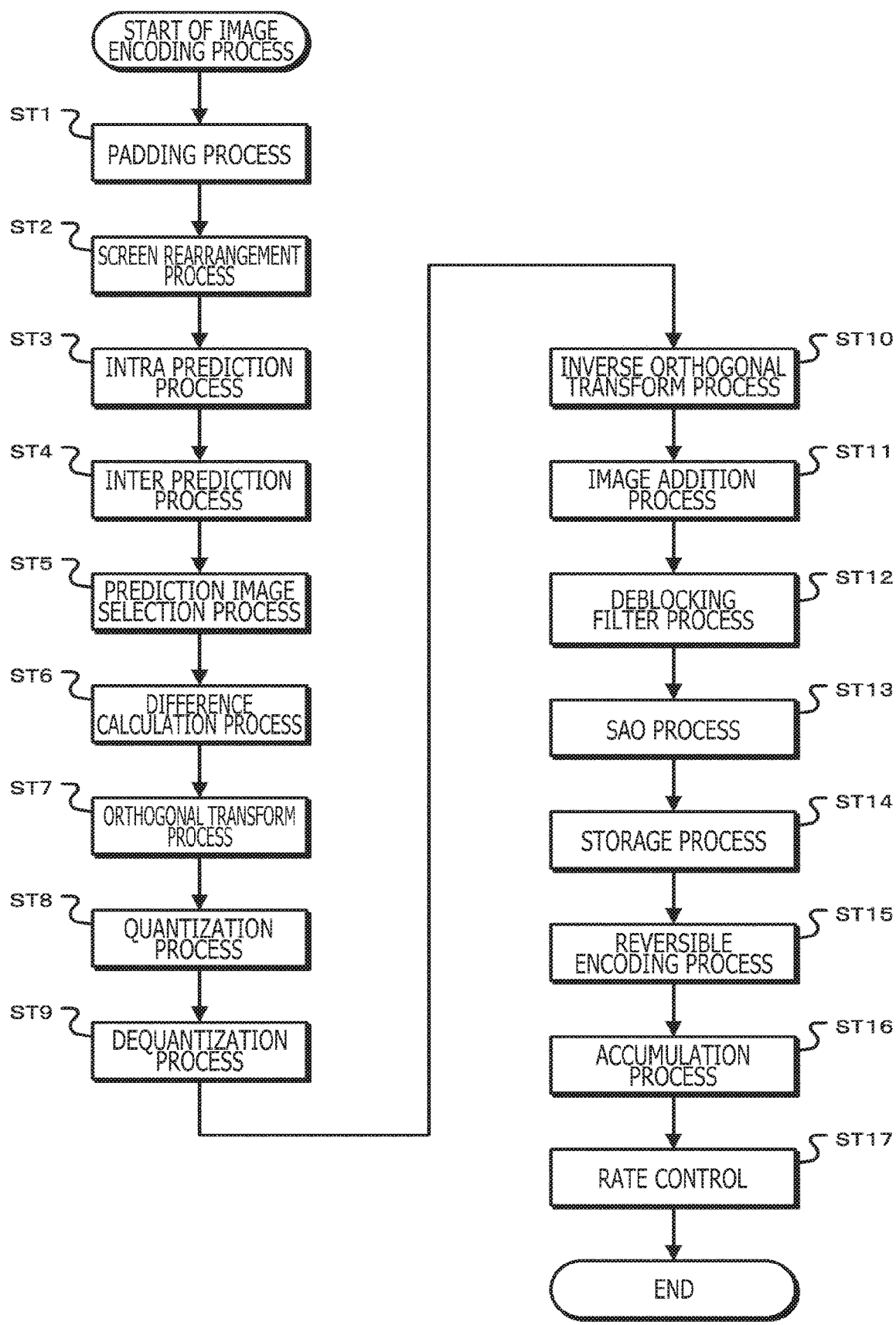
FIG. 5 is a flow chart exemplifying operation of the first embodiment of the image encoding apparatus.

Now, operation of the first embodiment of the image encoding apparatus is described. FIG. 5 is a flow chart exemplifying operation of the first embodiment of the image encoding apparatus.

In step ST1, the image encoding apparatus performs a padding process. The padding processing section 21 of the image encoding apparatus 10 replaces an image at a position to be used in a prediction process outside a valid region of a fisheye image with an image at a corresponding position in a valid region of another fisheye image. For example, while the padding processing section 21 is scanning the input image in a raster order in a unit of an encoding block (CTU), it decides whether the concerned encoding block unit includes a boundary of a fisheye image or the encoding block unit is outside the valid region of the fisheye image. In a case that is one of a case in which decision is one of that the concerned encoding block unit includes a boundary of the fisheye mage and another case in which the concerned block unit is outside the valid region of the fisheye image, the padding processing section 21 performs a padding process. On the other hand, in the case where the concerned encoding block unit is within the valid region and does not include a boundary of the fisheye image, the padding processing section 21 does not perform a padding process.

In step ST2, the image encoding apparatus performs a screen rearrangement process. The screen rearrangement buffer 22 of the image encoding apparatus 10 rearranges the input images after the padding process that are ordered in the displaying order into an encoding order and outputs a result of the rearrangement to the intra prediction section 41, the inter prediction section 42, and the SAO filter 35.

In step ST3, the image encoding apparatus performs an intra prediction process. The intra prediction section 41 of the image encoding apparatus 10 uses reference image data read out from the frame memory 36 to perform intra prediction of pixels of a block of a processing target in all intra prediction modes that are candidates to generate prediction image data. Further, the intra prediction section 41 uses the generated prediction image data and the original image data to calculate a cost function value. It is to be noted that decoded image data that has not been subjected to a filter process by the deblocking filter 34 or the like is used as the reference image data. The intra prediction section 41 selects an optimum intra prediction mode on the basis of the calculated cost function value and outputs prediction image data generated by intra prediction of the optimum intra prediction mode, parameters and the cost function value to the prediction selection section 43.

In step ST4, the image encoding apparatus performs an inter prediction process. The inter prediction section 42 of the image encoding apparatus 10 performs inter prediction of pixels of a block of a processing target in all inter prediction modes that become candidates to generate a prediction image. Further, the inter prediction section 42 calculates a cost function value by using the generated prediction image data and the original image data. It is to be noted that decoded image data that has been subjected to a filter process by the deblocking filter 34 or the like is used as the reference image data. The inter prediction section 42 determines an optimum inter prediction mode on the basis of the calculated cost function values and outputs a prediction image generated by the optimum inter prediction mode, parameters, and the cost function value to the prediction selection section 43.

In step ST5, the image encoding apparatus performs a prediction image selection process. The prediction selection section 43 of the image encoding apparatus 10 determines one of the optimum intra prediction mode and the optimum inter prediction mode as an optimum prediction mode on the basis of the cost function values calculated in step ST2 and step ST3. Then, the prediction selection section 43 selects and outputs the prediction image data of the determined optimum prediction mode to the calculation sections 23 and 33. It is to be noted that the prediction image data is used in calculation in steps ST5 and ST11 hereinafter described. Further, the prediction selection section 43 outputs parameters relating to the optimum prediction mode to the reversible encoding section 26.

In step ST6, the image encoding apparatus performs a difference calculation process. The calculation section 23 of the image encoding apparatus 10 calculates the difference between the original image data rearranged in step ST2 and the prediction image data selected in step ST5 and outputs residual data that is a result of the difference to the orthogonal transform section 24.

In step ST7, the image encoding apparatus performs an orthogonal transform process. The orthogonal transform section 24 of the image encoding apparatus 10 orthogonally transforms the residual data supplied from the calculation section 23. In particular, the orthogonal transform section 24 performs orthogonal transform such as discrete cosine transform and outputs transform coefficients obtained by the orthogonal transform to the quantization section 25.

In step ST8, the image encoding apparatus performs a quantization process. The quantization section 25 of the image encoding apparatus 10 quantizes the transform coefficients supplied from the orthogonal transform section 24. Upon this quantization, the rate is controlled as described in connection with a process in step ST17 hereinafter described.

The quantization information generated in such a manner as described above is locally decoded in the following manner. In particular, in step ST9, the image encoding apparatus performs a dequantization process. The dequantization section 31 of the image encoding apparatus 10 dequantizes the quantization data outputted from the quantization section 25 with a characteristic corresponding to that of the quantization section 25.

In step ST10, the image encoding apparatus performs an inverse orthogonal transform process. The inverse orthogonal transform section 32 of the image encoding apparatus 10 inversely orthogonally transforms the dequantized data generated by the dequantization section 31 with a characteristic corresponding to that of the orthogonal transform section 24 to generate residual data and outputs the residual data to the calculation section 33.

In step ST11, the image encoding apparatus performs an image addition process. The calculation section 33 of the image encoding apparatus 10 adds the prediction image data outputted from the prediction selection section 43 to the locally decoded residual data to generate a locally decoded (namely, locally decoded) image.

In step ST12, the image encoding apparatus performs a deblocking filter process. The deblocking filter 34 of the image encoding apparatus 10 performs a deblocking filter process for the image data outputted from the calculation section 33 to remove block distortion and outputs resulting image data to the SAO filter 35 and the frame memory 36.

In step ST13, the image encoding apparatus performs an SAO process. The SAO filter 35 of the image encoding apparatus 10 performs an SAO process for the image data outputted from the deblocking filter 34. By the SAO process, a type and a coefficient for the SAO process are determined for each LCU that is a maximum encoding unit and a filter process is performed using them. The SAO filter 35 stores image data after the SAO process into the frame memory 36. Further, the SAO filter 35 outputs parameters relating to the SAO process to the reversible encoding section 26 such that they are reversibly encoded in step ST15 as hereinafter described.

In step ST14, the image encoding apparatus performs a storage process. The frame memory 36 of the image encoding apparatus 10 stores the image before the filter process therefor is performed by the deblocking filter 34 or the like and the image after the filter process is performed by the deblocking filter 34 or the like.

On the other hand, the transform coefficients quantized in step ST8 described hereinabove are outputted also to the reversible encoding section 26. In step ST15, the image encoding apparatus performs reversible encoding. The reversible encoding section 26 of the image encoding apparatus 10 encodes the transform coefficients after the quantization or the residual data after the dequantization outputted from the quantization section 25 and the parameters supplied thereto.

In step ST16, the image encoding apparatus performs an accumulation process. The accumulation buffer 27 of the image encoding apparatus 10 accumulates the encoded data. The encoded data accumulated in the accumulation buffer 27 is suitably read out and transmitted to the decoding side through a transmission line or the like.

In step ST17, the image encoding apparatus performs rate control. The rate controlling section 28 of the image encoding apparatus 10 controls the rate of the quantization operation of the quantization section 25 such that the encoded data accumulated in the accumulation buffer 27 may not suffer from overflow or underflow.

The image encoding apparatus performs such processes as described above up to the end of images for each CTU.

According to such a first embodiment as described above, by performing a padding process, an image at a position to be used in a prediction process outside a valid region of a fisheye image is replaced with an image at a corresponding position in a valid region in another fisheye image. Accordingly, for example, in generation of a prediction image using an invalid image in an intra prediction process or in an inter prediction process, generation of a prediction image using a motion vector of low accuracy arising from that an invalid image is included in a search range for a motion vector can be prevented from being performed. Therefore, even with a fisheye image, the prediction error in an inter prediction process and an inter prediction process can be reduced similarly as in the related art. Consequently, the encoding efficiency of a fisheye image can be enhanced in comparison with that in an alternative case in which the padding process is not performed.

2-1-3. Another Operation of First Embodiment

Now, another operation of the first embodiment is described. In this operation, a padding process is performed in the case where, using an image at a position to be used in a prediction process as an image at a position to be used in a prediction process of an encoded block in which a fisheye image is included, the image at the position to be used in the prediction process is outside a valid region.

Figure 6:
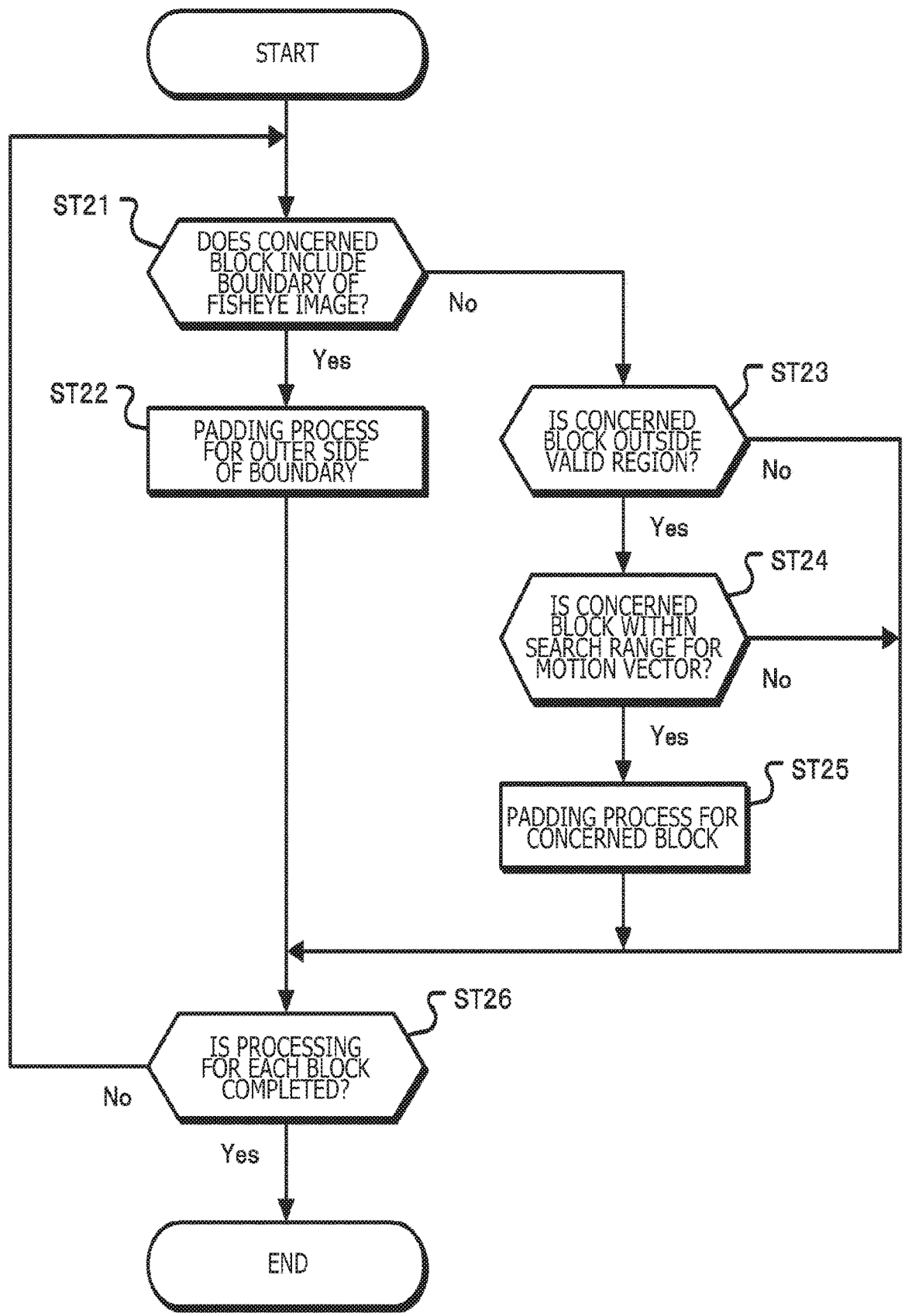
FIG. 6 is a flow chart illustrating another operation of the first embodiment.

FIG. 6 is a flow chart exemplifying another operation of the first embodiment and corresponds to a modification of the process in step ST1 in the flow chart depicted in FIG. 5.

In step ST21, the padding processing section 21 decides whether the concerned block includes a boundary of a fisheye image. While the padding processing section 21 scans the input image in a raster order in an encoded block unit (CTC), it decides whether the concerned block includes a boundary of the fisheye image. In the case where the padding processing section 21 decides that the concerned block includes a boundary of the fisheye image, the processing advances to step ST22, but in the case where the padding processing section 21 detects that the concerned block does not include a boundary of the fisheye image, the processing advances to step ST23.

In step ST22, the padding processing section 21 performs a padding process for the outer side of the boundary. The padding processing section 21 replaces an image of the region on the outer side of the boundary with an image at a corresponding position in a valid region of another fisheye image. Then, the processing advances to step ST26.

In step ST23, the padding processing section 21 decides whether the concerned block is outside a valid region. In the case where the padding processing section 21 decides that the concerted block is outside the valid region of the fisheye image, the processing advances to step ST24, but in the case where the padding processing section 21 decides that the concerned block is within the valid region, the processing advances to step ST26.

In step ST24, the padding processing section 21 decides whether the concerted block is included in the search range. In the case where the padding processing section 21 decides that the concerned block is included in the search range for a motion vector, the processing advances to step ST25, but in the case where the padding processing section 21 decides that the concerned block is not included in the search range, the processing advances to step ST26.

In step ST25, the padding processing section 21 performs a padding process for the concerted block. Since the concerned block is included in the search range but outside the valid region of the fisheye image, the padding processing section 21 replaces the image of the concerned block with an image at a corresponding position in the valid region of the other fisheye image. Then, the processing advances to step ST26.

In step ST26, the padding processing section 21 decides whether the process for the blocks is completed. In the case where the padding processing section 21 does not complete the process of the blocks in the picture, the processing returns to step ST21, but in the case where the padding processing section 21 completes the process of the block of one picture, it performs the process for a next picture.

Where the padding processing section 21 performs such a padding process as described above, an image only in a region that is necessitated in a prediction process of an encoded block including a fisheye image is replaced with an image at a corresponding position in a valid region of another fisheye image. Accordingly, the padding process can be performed efficiently.

2-1-4. Example of Operation of Intra Prediction and Inter Prediction

Figure 7:
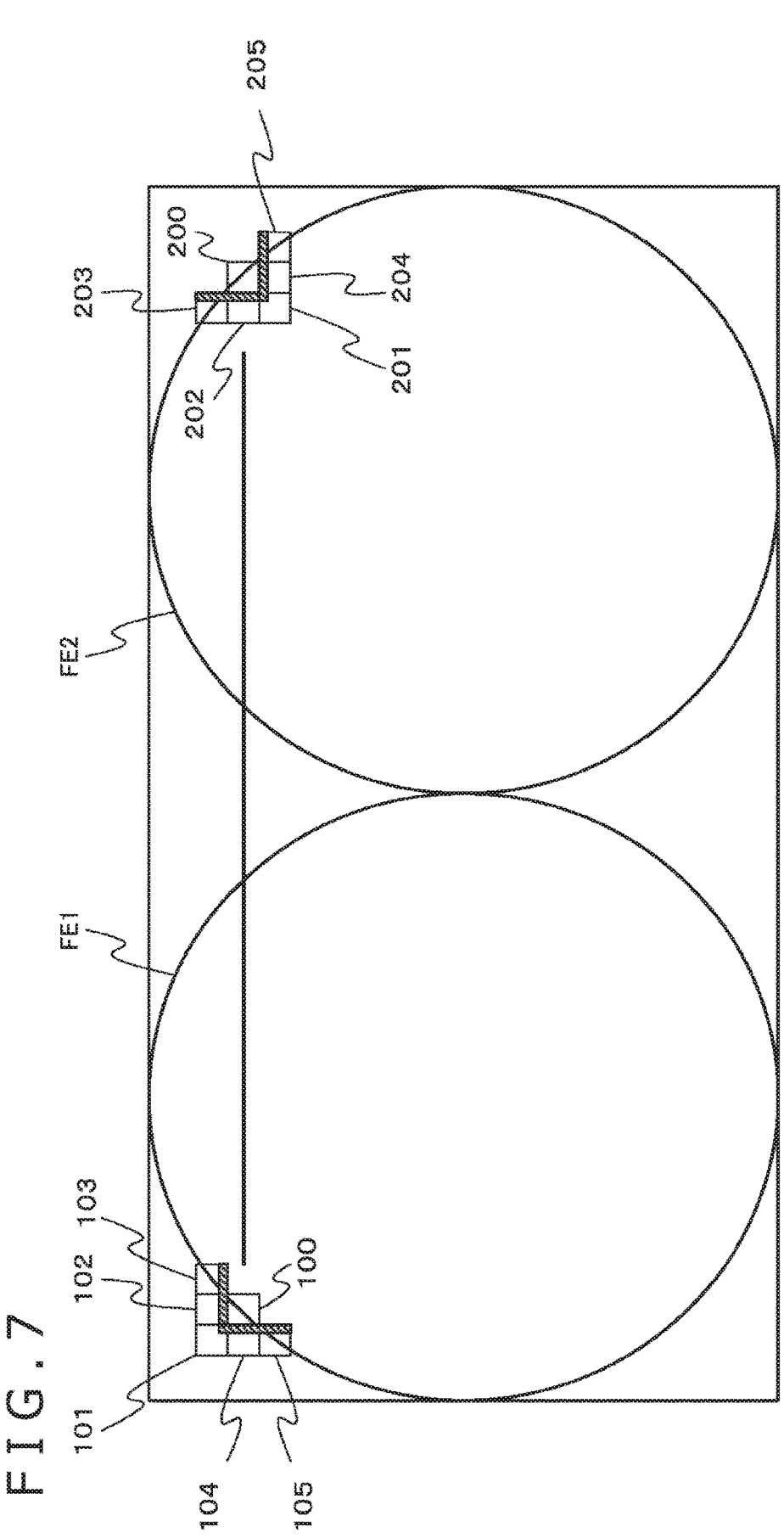
FIG. 7 is a view illustrating action of the padding process upon intra prediction.

FIG. 7 is a view illustrating action of a padding process upon intra prediction. A case in which a block 100 is intra predicted is described.

If a padding process is performed, then images, for example, outside of valid regions of the block 100 and adjacent regions 101 to 105, which are adjacent the block 100, in the fisheye image FE1 are replaced with corresponding images in valid regions of regions 201 to 205 adjacent a block 200 of the fisheye image FE2 corresponding to the block 100. Accordingly, the intra prediction section 41 can perform an intra prediction process using the images in the valid regions by using an image indicated by a slanting line region of the peripheral blocks of the block 100.

Figure 8:
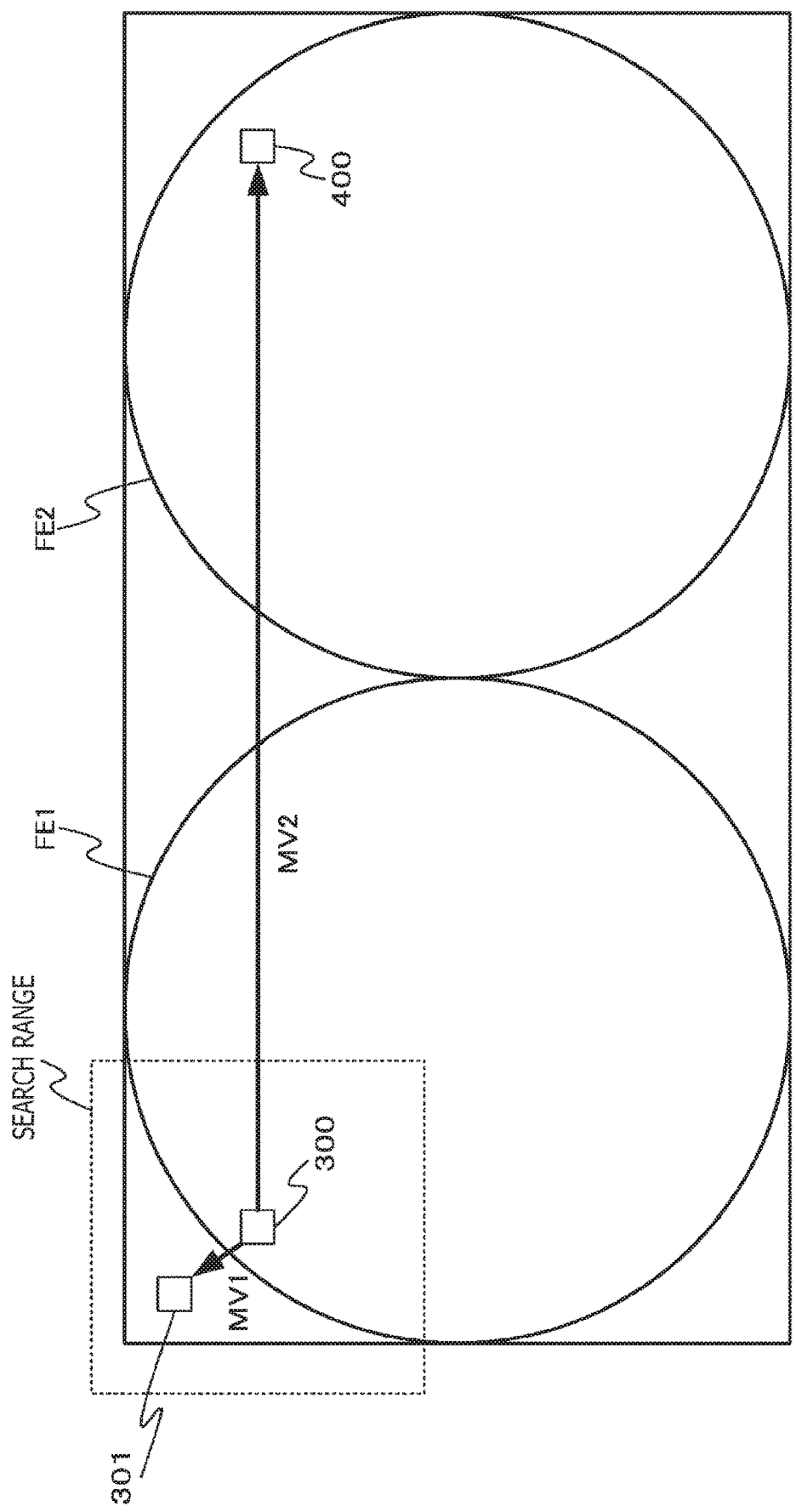
FIG. 8 is a view illustrating action of the padding process upon inter prediction.

FIG. 8 is a view illustrating action of a padding process upon inter prediction. If the padding process is performed, then an image in a search range outside the valid region of the fisheye image FE1 is replaced with an image at a corresponding position in the valid region of the fisheye image FE2. Accordingly, in the case where search for a motion vector is performed and the position at which the error from a block 300 is in the minimum is a block 301, an inter prediction process can be performed using a motion vector MV1, namely, a motion vector MV2, as an optimum motion vector.

In such a manner, by using an image after a padding process, even with a fisheye image, an intra prediction process and an inter prediction process can be performed similarly as in the related art. Therefore, even if an encoding target image is a fisheye image, encoding can be performed efficiently.

2-2. Second Embodiment of Image Encoding Apparatus>

The first embodiment of the image encoding apparatus described above is directed to a case in which quantization and prediction processes are performed after a padding process is performed. However, in a second embodiment, quantization and prediction processes are performed using a two-dimensional image for which a padding process is not performed as yet, and in the case where an image to be used in the prediction process is at a position outside a valid region, the image is replaced with an image at a corresponding position in a valid region of another fisheye image.

2-2-1. Configuration of Second Embodiment

Figure 9:
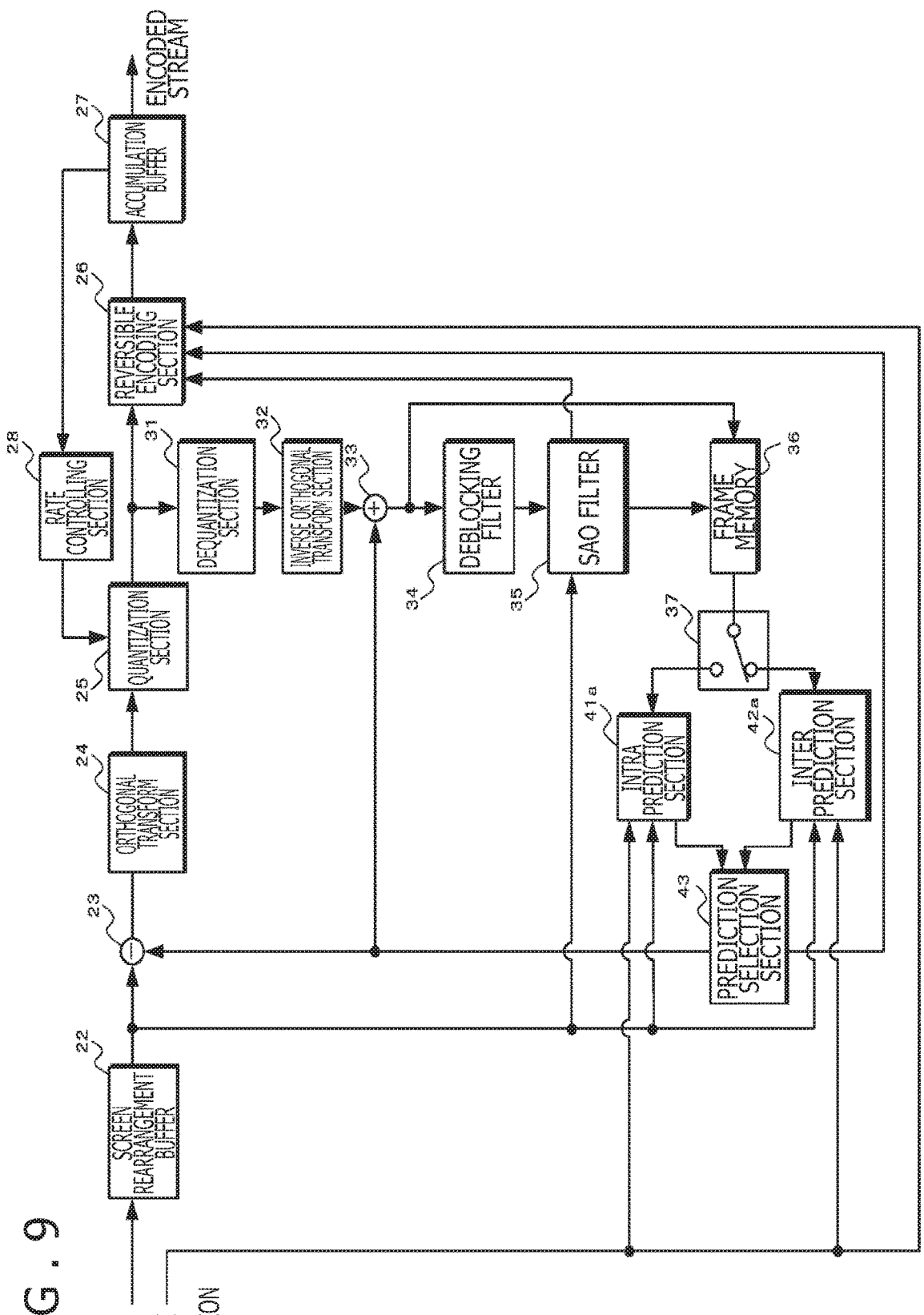
FIG. 9 is a view exemplifying a configuration of a second embodiment of an image encoding apparatus.

FIG. 9 exemplifies a configuration of a second embodiment of the image encoding apparatus. An image encoding apparatus 10a performs encoding of image data using a prediction process to generate an encoded stream compatible, for example, with HEVC.

The image encoding apparatus 10a includes a screen rearrangement buffer 22, a calculation section 23, an orthogonal transform section 24, a quantization section 25, a reversible encoding section 26, an accumulation buffer 27, and a rate controlling section 28. The image encoding apparatus 10 further includes a dequantization section 31, an inverse orthogonal transform section 32, a calculation section 33, a deblocking filter 34, an SAO (Sample Adaptive Offset) filter 35, a frame memory 36, and a selection section 37. Furthermore, the image encoding apparatus 10a includes an intra prediction section 41a, an inter prediction section 42a, and a prediction selection section 43.

An input image, in particular, a two-dimensional image in which a plurality of fisheye images acquired from a plurality of image sensors and, for example, configuring 360 degrees in all directions is provided, is inputted to the screen rearrangement buffer 22. Further, fisheye image information inputted together with the fisheye images is inputted to the intra prediction section 41a, the inter prediction section 42a, and the reversible encoding section 26.

The screen rearrangement buffer 22 stores an input image and rearranges such input images of a displaying order stored therein into an order for encoding (encoding order) according to a GOP (Group of Picture) structure. The screen rearrangement buffer 22 outputs the image data of the frame images in the encoding order (original image data) to the calculation section 23. Further, the screen rearrangement buffer 22 outputs the original image data to the SAO filter 35, the intra prediction section 41, and the inter prediction section 42.

The calculation section 23 subtracts, for each pixel, prediction image data supplied from the intra prediction section 41 or the inter prediction section 42 through the prediction selection section 43 from the original image data supplied from the screen rearrangement buffer 22 and outputs residual data indicative of a prediction residual to the orthogonal transform section 24.

The orthogonal transform section 24 performs an orthogonal transform process for the residual data supplied from the calculation section 23 and outputs obtained transform coefficients in a frequency region to the quantization section 25.

The quantization section 25 quantizes the transform coefficients outputted from the orthogonal transform section 24. The quantization section 25 outputs quantization data of the transform coefficients to the reversible encoding section 26. Further, the quantization section 25 outputs the generated quantization data also to the dequantization section 31.

The reversible encoding section 26 performs a reversible encoding process of the quantization data inputted from the quantization section 25 for each CTU. Further, the reversible encoding section 26 acquires bock information indicative of how parameters of a prediction mode, parameters relating to a filter process, CTUs and so forth are to be set. The reversible encoding section 26 encodes the quantization data, encodes parameters and fisheye image information, and accumulates them as part of header information into the accumulation buffer 27.

The accumulation buffer 27 temporarily retains the data supplied from the reversible encoding section 26 and outputs, at a predetermined timing, the data as an encoded image that is in an encoded state and as an encoded stream, for example, to a recording apparatus, a transmission line or the like not depicted in a succeeding stage.

The rate controlling section 28 controls the rate of the quantization operation of the quantization section 25 on the basis of the compression images accumulated in the accumulation buffer 27 such that an overflow or an underflow does not occur.

The dequantization section 31 dequantizes the quantization data of the transform coefficients supplied from the quantization section 25 by a method corresponding to that of the quantization performed by the quantization section 25. The dequantization section 31 outputs obtained dequantization data to the inverse orthogonal transform section 32.

The inverse orthogonal transform section 32 inverse orthogonal transforms the dequantization data supplied thereto by a method corresponding to that of the orthogonal transform process performed by the orthogonal transform section 24. The inverse orthogonal transform section 32 outputs a result of the inverse orthogonal transform, namely, restored residual data, to the calculation section 33.

The calculation section 33 adds the prediction image data supplied from the intra prediction section 41 or the inter prediction section 42 through the prediction selection section 43 to the residual data supplied from the inverse orthogonal transform section 32 to obtain a locally decoded image (decoded image) and outputs the locally decoded image to the deblocking filter 34. Further, the calculation section 33 outputs decoded image data as reference image data to the frame memory 36.

The deblocking filter 34 suitably performs a deblocking filter process to remove block distortion of decoded image data. The deblocking filter 34 outputs a result of the filter process to the SAO filter 35.

The SAO filter 35 performs an adaptive offset filter process for the decoded image data after the filter by the deblocking filter 34. The SAO filter 35 outputs an image after the SAO process to the frame memory 36.

Reference image data accumulated in the frame memory 36 is outputted to the intra prediction section 41a or the inter prediction section 42a at a predetermined timing through the selection section 37.

The intra prediction section 41a executes an intra prediction process for each of one or more PUs set in each CTU on the basis of original image data and decoded image data. The intra prediction section 41a evaluates a cost function value based on a prediction error and a code amount to be generated for each of prediction mode candidates specified by H.265/HEVC. Further, in the case where the prediction mode candidate is outside a valid region of a fisheye image, the intra prediction section 41a performs a padding process of replacing an image outside the valid region with an image at a corresponding position in a valid region of another fisheye image. The intra prediction section 41a selects a prediction mode in which the cost function value is in the minimum, namely, a prediction mode in which the compression ratio is in the maximum, as an optimum prediction mode. Further, the intra prediction section 41a generates prediction image data in accordance with the selected optimum prediction mode. Then, the intra prediction section 41a outputs information relating to intra prediction including the prediction mode information indicative of the optimum prediction mode, the corresponding cost function value, and the prediction image data to the prediction selection section 43.

The inter prediction section 42a executes an inter prediction process (motion detection and motion compensation) for each of one or more PUs set in each CTU on the basis of the original image data and the decoded image data. The inter prediction section 42 evaluates a cost function value based on a prediction error and a code amount to be generated for each of prediction mode candidates included in a search range for a motion vector specified by H.265/HEVC. Further, in the case where the search range includes a region outside a valid region of a fisheye image, the inter prediction section 42*a* performs a padding process of replacing an image outside the valid region with an image at a corresponding position in a valid region of another fisheye image. The inter prediction section 42*a* selects a prediction mode in which the cost function value is in the minimum, namely, a prediction mode in which the compression ratio is highest, as an optimum prediction mode. Further, the inter prediction section 42*a* generates prediction image data in accordance with the selected optimum prediction mode. Then, the inter prediction section 42*a* outputs information relating to inter prediction, the corresponding cost function value, and the prediction image data to the prediction selection section 43.

The prediction selection section 43 sets a prediction mode for each CTU or for each CU on the basis of comparison of cost function values inputted from the intra prediction section 41*a* and the inter prediction section 42*a*. In regard to a block to which the intra prediction mode is set, the prediction selection section 43 outputs prediction image data generated by the intra prediction section 41*a* to the calculation sections 23 and 33 and outputs information relating to intra prediction to the reversible encoding section 26. Further, in regard to a block to which the inter prediction mode is set, the prediction selection section 43 outputs prediction image data generated by the inter prediction section 42 to the calculation sections 23 and 33 and outputs information relating to inter prediction to the reversible encoding section 26.

2-2-2. Operation of Second Embodiment

Figure 10:
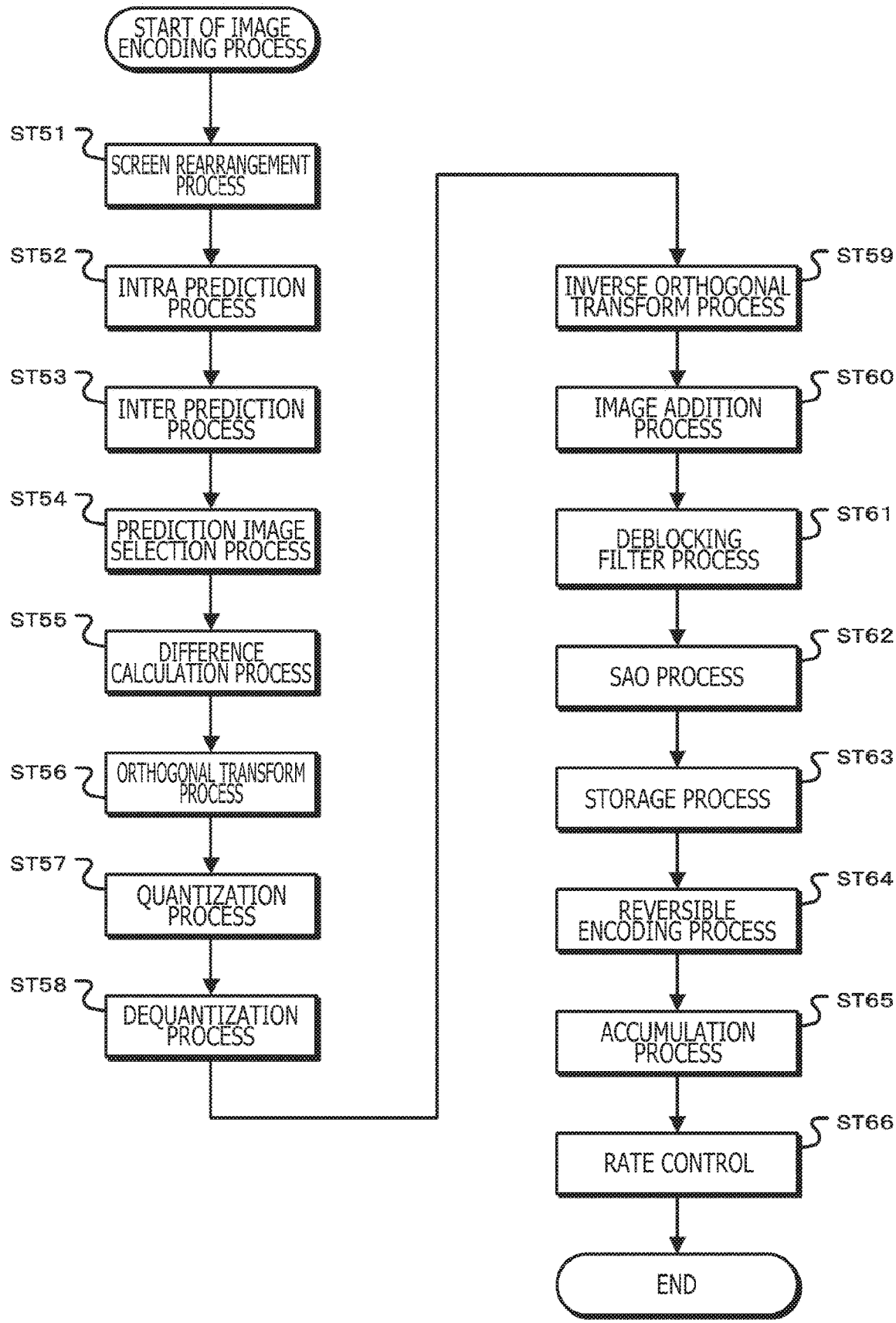
FIG. 10 is a flow chart exemplifying operation of the second embodiment of the image encoding apparatus.

Now, operation of the second embodiment of the image encoding apparatus is described. FIG. 10 is a flow chart exemplifying operation of the second embodiment of the image encoding apparatus.

In step ST51, the image encoding apparatus performs a screen rearrangement process. The screen rearrangement buffer 22 of the image encoding apparatus 10*a* rearranges input images of a displaying order into an encoding order and outputs the rearranged input images to the intra prediction section 41*a*, the inter prediction section 42*a*, and the SAO filter 35.

In step ST52, the image encoding apparatus performs an intra prediction process. The intra prediction section 41*a* of the image encoding apparatus 10 performs generation of prediction image data using reference image data read out from the frame memory 36 to intra predict pixels of blocks of a processing target in all intra prediction modes that are candidates and calculates a cost function value using the generated prediction image data and the original image data. It is to be noted that, as the reference image data, decoded image data (image data encoded already) that are not subject to a filter process by the deblocking filter 34 and so forth is used. The intra prediction section 41 selects an optimum intra prediction mode on the basis of the calculated cost function values and outputs the prediction image data generated by the intra prediction of the optimum intra prediction mode, parameters and the cost function values to the prediction selection section 43. The intra prediction section 41 selects an optimum intra prediction mode on the basis of the calculated cost function values and outputs the prediction image data generated by the intra prediction of the optimum intra prediction mode, parameters and the cost function values to the prediction selection section 43.

Further, in the case where the block of a processing target includes an image of an invalid region, the intra prediction section 41*a* performs a padding process of using, as an image of the invalid region, an image of a corresponding region from the valid region encoded already of another fisheye image.

Figure 11:
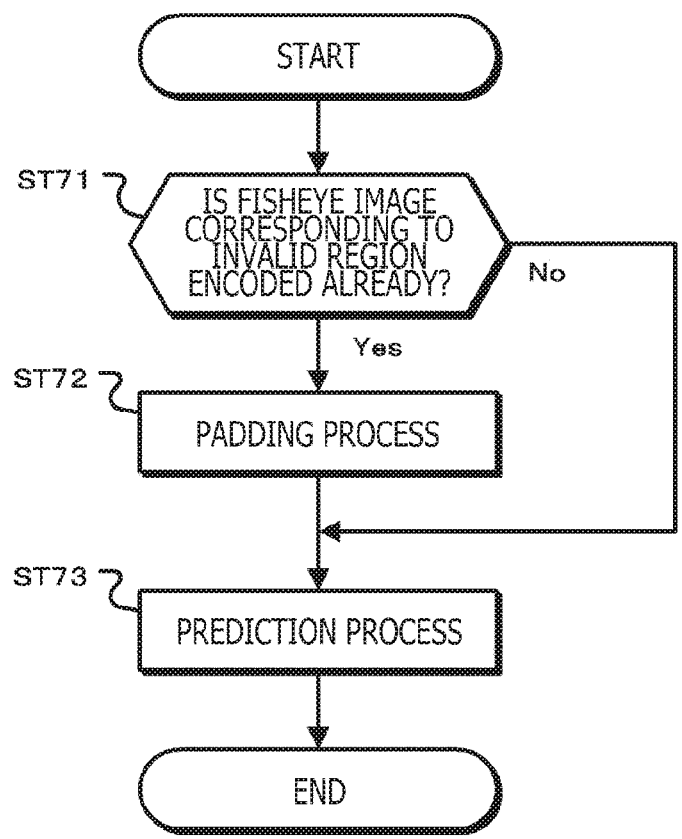
FIG. 11 is a flow chart exemplifying padding operation upon intra prediction.

FIG. 11 is a flow chart exemplifying padding operation upon intra prediction. In step ST71, the intra prediction section 41*a* decides whether the fisheye image corresponding to the invalid region is encoded already. In the case where the intra prediction section 41*a* decides that there is an encoded image corresponding to the invalid region, the processing advances to step ST72, but in the case where the intra prediction section 41*a* decides that there is no encoded image corresponding to the invalid region, the processing advances to step ST73.

In step ST72, the intra prediction section 41*a* performs a padding process. The intra prediction section 41*a* performs a padding process to replace the image of the invalid region with an image of the region corresponding region from the valid region encoded already of the other fisheye image. Then, the processing advances to step ST73.

In step ST73, the intra prediction section 41*a* performs a prediction process. The intra prediction section 41*a* performs a process similar to that of the related art. In particular, the intra prediction section 41*a* performs intra prediction in all intra prediction modes to generate prediction image data and performs selection of an optimum intra prediction mode and so forth, on the basis of cost function values calculated using the generated prediction image mode and the original image mode.

Figure 12A:
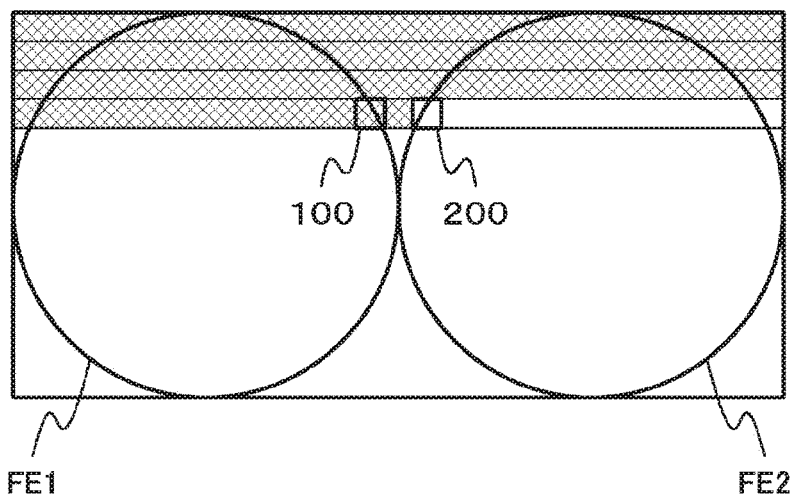
FIGS. 12A and 12B illustrate views depicting an example of padding operation upon intra prediction.
Figure 12B:
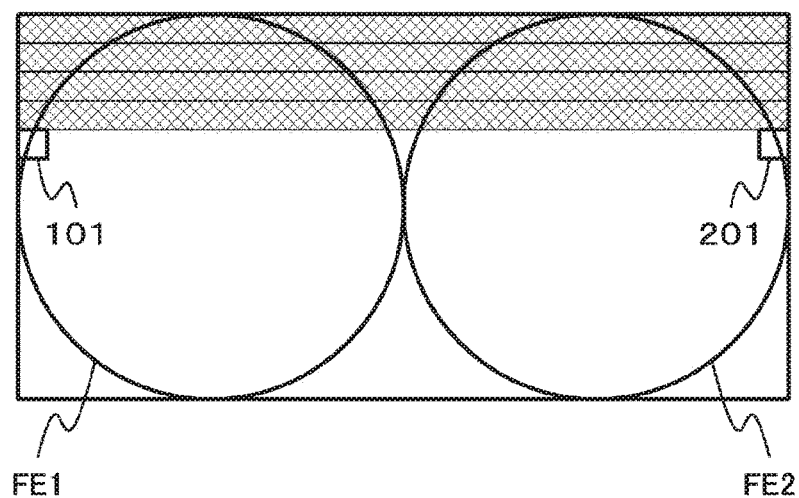

FIGS. 12A and 12B depict an example of a padding operation upon intra prediction. It is to be noted that a slanting line region indicates an encoded region.

As depicted in FIG. 12A, in the case where the concerned block is the block 200 of the fisheye image FE2, since the block 100 of the fisheye image FE1 corresponding to the block 200 is in an already encoded state, an image outside a boundary of the fisheye image of the block 200 is replaced with an image of a valid region corresponding to the block 100.

On the other hand, as depicted in FIG. 12B, in the case where the concerned block is a block 101 of the fisheye image FE1, a block 201 of the fisheye image FE2 corresponding to the block 101 is not in an encoded state as yet, and therefore, a padding process cannot be used. Therefore, an intra prediction process is performed without performing a padding process.

In step ST53 of FIG. 10, the image encoding apparatus performs an inter prediction process. The inter prediction section 42 of the image encoding apparatus 10 performs inter prediction of pixels of the block of the processing target in all inter prediction modes to generate prediction image data and calculates a cost function value using the generated prediction image data and the original image data. It is to be noted that, as the reference image data, decoded image data for which a filter process has been performed by the deblocking filter 34 or the like is used. The inter prediction section 42 determines an optimum inter prediction mode on the basis of the calculated cost function values and outputs a prediction image generated in the optimum inter prediction mode, parameters, and the cost function value to the prediction selection section 43.

Further, in the case where a block indicated by a motion vector is outside the picture frame, the inter prediction section 42 performs a padding process of using an image of a region corresponding to a valid region of another fisheye image.

Figure 13:
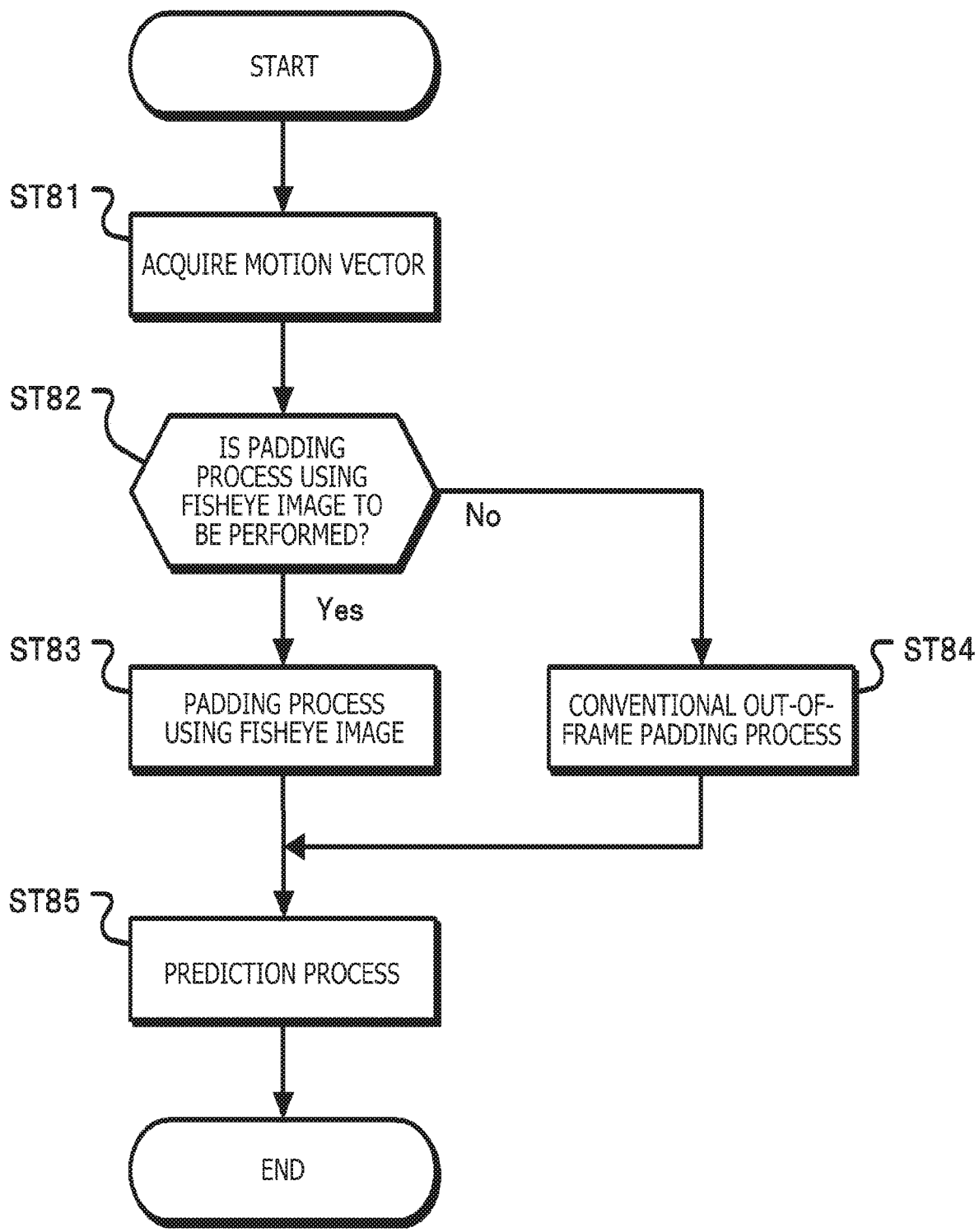
FIG. 13 is a flow chart exemplifying padding operation upon inter prediction.

FIG. 13 is a flow chart exemplifying a padding operation upon inter prediction. In step ST81, the inter prediction section 42*a* acquires a motion vector. The inter prediction section 42*a* acquires a motion vector of an encoding target block, and the processing advances to step ST82.

In step ST82, the inter prediction section 42*a* decides whether a padding process using a fisheye image is to be performed. In the case where the inter prediction section 42*a* is to perform a padding process using a fisheye image in the case where the block indicated by the motion vector acquired in step ST81 is outside the picture frame, the processing advances to step ST83, but in the case where the fisheye image is not to be used, the processing advances to step ST84.

In step ST83, the inter prediction section 42*a* performs a padding process using the fisheye image. The inter prediction section 42*a* performs a padding process using the fisheye image and uses, as the region outside the picture frame, an image of a corresponding region from the valid region encoded already of the other fisheye image. Thereafter, the processing advances to step ST85.

In step ST84, the inter prediction section 42*a* performs a conventional out-of-frame padding process. The intra prediction section 41*a* replaces the image outside the frame with the invalid image, and the processing advances to step ST85.

In step ST85, the inter prediction section 42*a* performs a prediction process. The inter prediction section 42*a* uses the image obtained by the padding process in step ST83 or step ST84 as prediction image data and performs selection of an optimum inter prediction mode and so forth, on the basis of the generated prediction image data and cost function values calculated using the original image data.

Figure 14:
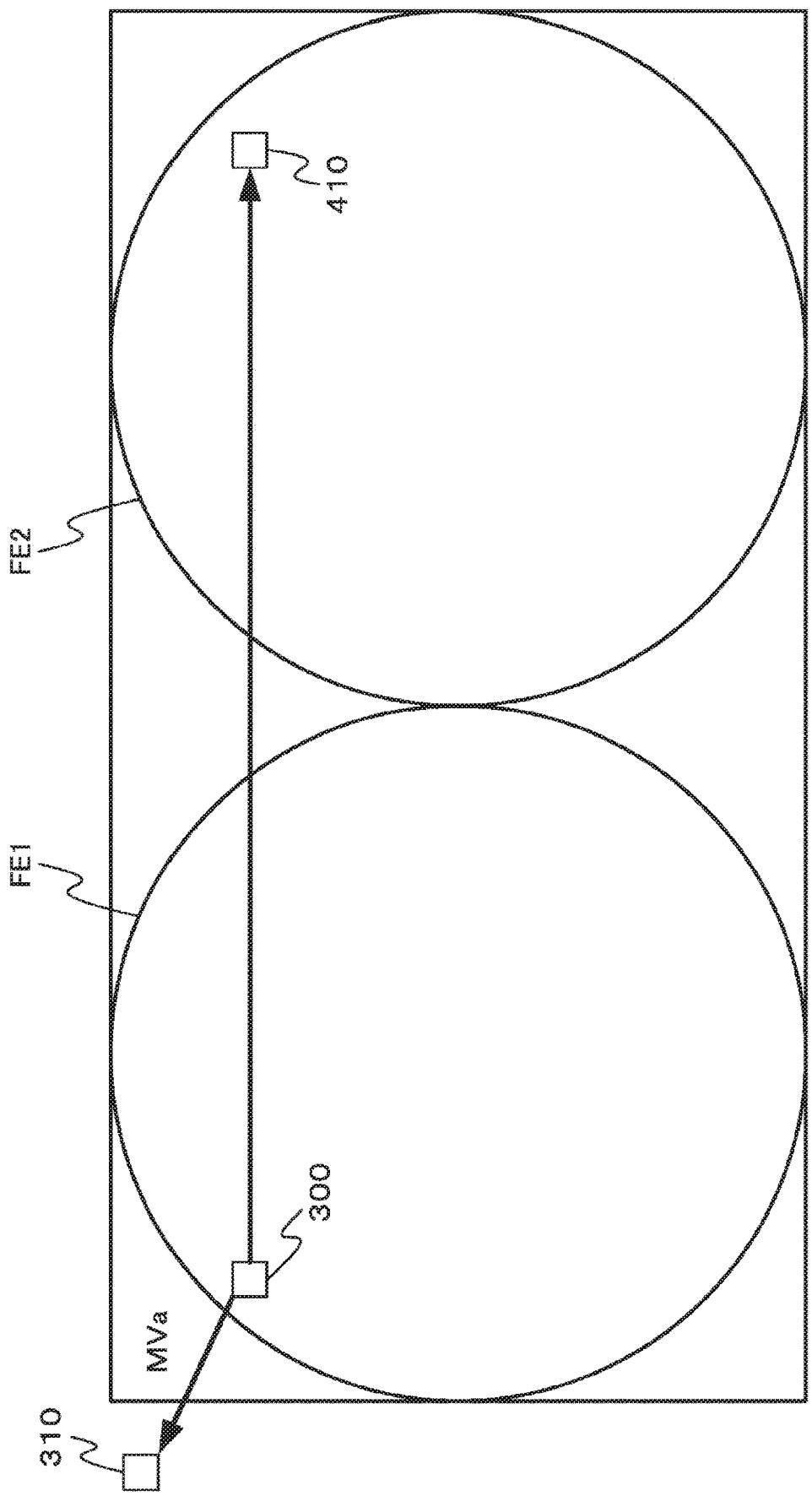
FIG. 14 is a view depicting an example of padding operation upon inter prediction.

FIG. 14 depicts an example of padding operation upon inter prediction. When a motion vector MVa acquired in step ST81 indicates outside the picture frame in regard to a concerned block 300, decision of whether fisheye image information is to be used in padding is performed. Here, in the case where fisheye image information is to be used, in the padding process, an image of a reference block 310 indicated by the motion vector MV1 from a radius and a center position of the fisheye image is replaced with an image of a corresponding block 410 in the valid region of the fisheye image FE2. Further, in the case where the fisheye image information is not to be used, in the padding process, an image of the reference block 310 indicated by the motion vector MV1 from the radius and the center position of the fisheye image is replaced with an image of black, gray or the like.

In step ST54 of FIG. 10, the image encoding apparatus performs a prediction image selection process. The prediction selection section 43 of the image encoding apparatus 10 determines one of the optimum intra prediction mode and the optimum inter prediction mode as an optimum prediction mode, on the basis of the cost function values calculated in step ST52 and step ST53. Then, the prediction selection section 43 selects and outputs the prediction image data of the determined optimum prediction mode to the calculation sections 23 and 33. It is to be noted that the pieces of prediction image data are utilized for calculation in step ST60 hereinafter described. Further, the prediction selection section 43 outputs parameters relating to the optimum prediction mode to the reversible encoding section 26.

In step ST55 to step ST66, processes similar to those in step ST6 to step ST17 of FIG. 5 are performed.

In such a manner, according to the second embodiment of the image encoding apparatus, even if a padding process is performed in intra prediction or inter prediction, a prediction encoding process of a high encoding efficiency can be performed similarly as in the first embodiment.

2-3. Image Decoding Apparatus>

Now, a configuration and operation of an image processing apparatus that performs a decoding process of an encoded stream generated by the image encoding apparatus 10 (10*a*) are described.

2-3-1. Configuration of Embodiment

Figure 4:
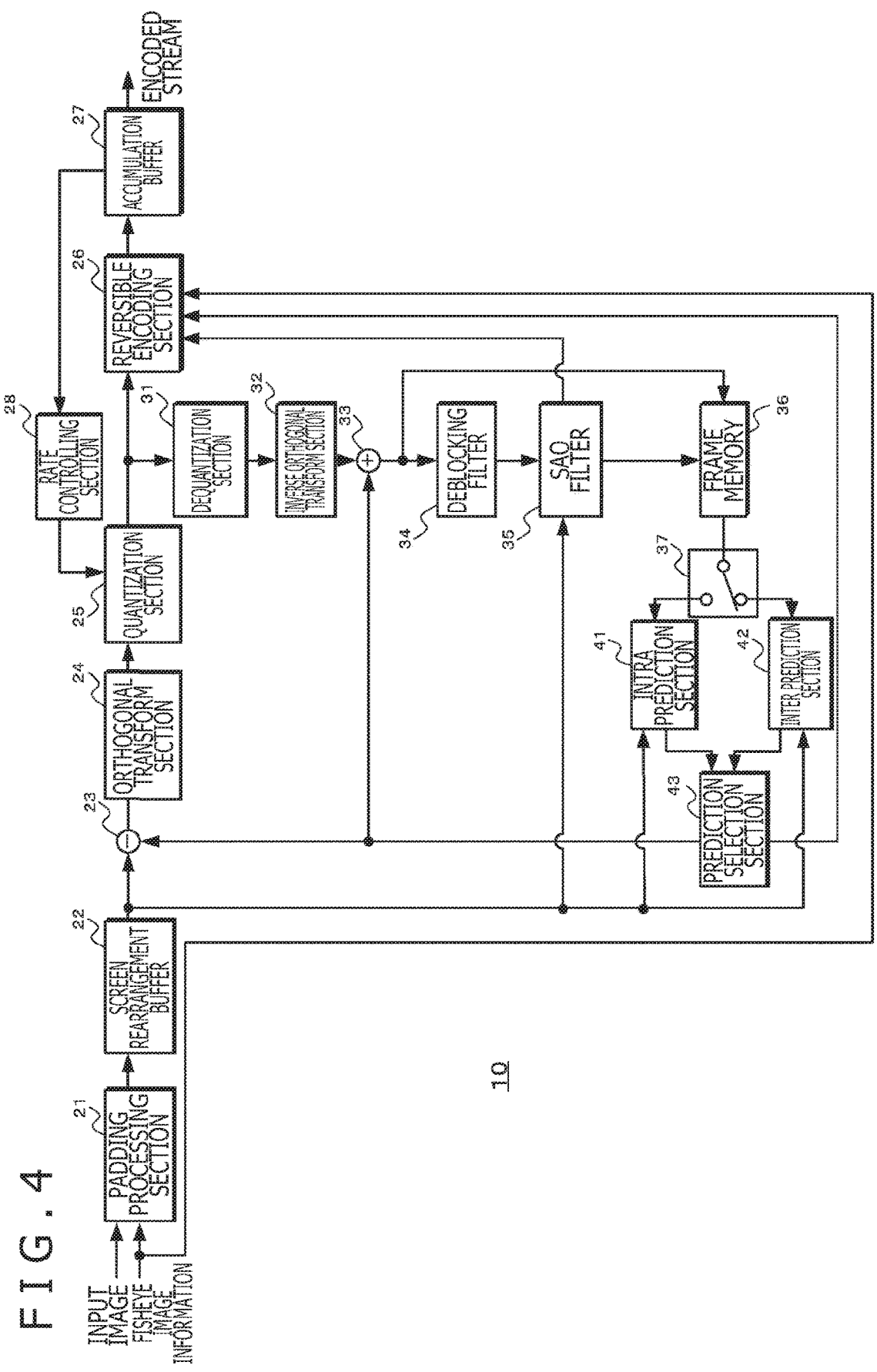
FIG. 4 is a view exemplifying a configuration of a first embodiment of an image encoding apparatus.
Figure 15:
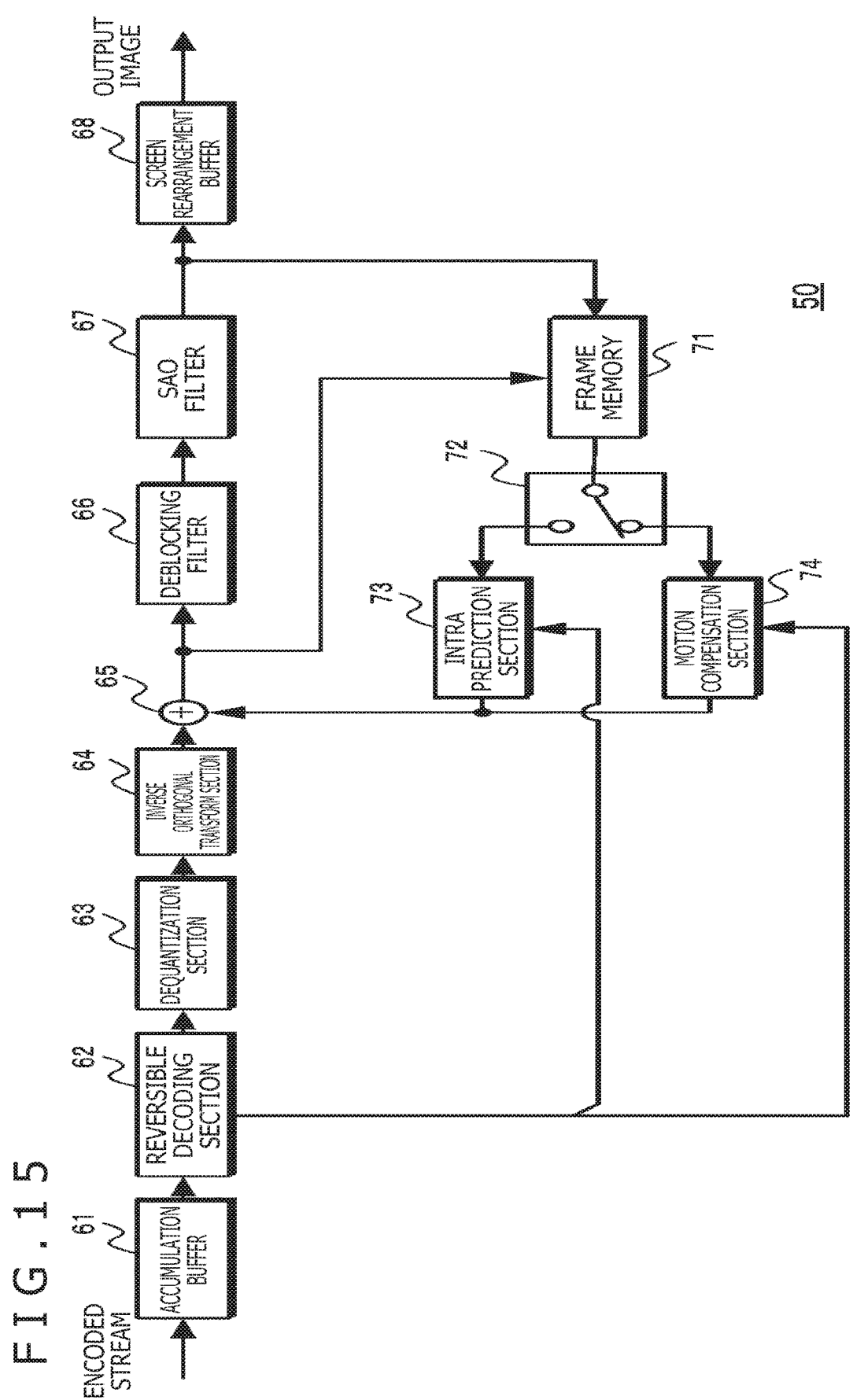
FIG. 15 is a view exemplifying a configuration of the embodiment of an image decoding apparatus.

FIG. 15 exemplifies a configuration of an embodiment of the image decoding apparatus, and the image decoding apparatus 50 is an image decoding apparatus corresponding to the image encoding apparatus 10 (10*a*) depicted in FIG. 4 (FIG. 9). An encoded stream generated by the image encoding apparatus 10 (10*a*) is supplied to and decoded by the image decoding apparatus 50.

The image decoding apparatus 50 includes an accumulation buffer 61, a reversible decoding section 62, a dequantization section 63, an inverse orthogonal transform section 64, a calculation section 65, a deblocking filter 66, an SAO filter 67, and a screen rearrangement buffer 68. The image decoding apparatus 50 further includes a frame memory 71, a selection section 72, an intra prediction section 73, and a motion compensation section 74.

The accumulation buffer 61 receives and accumulates an encoded stream transmitted thereto. This encoded stream is read out at a predetermined timing and outputted to the reversible decoding section 62.

The reversible decoding section 62 reversibly decodes the encoded stream and outputs parameters of information indicative of an intra prediction mode obtained by the reversible decoding and fisheye image information to the intra prediction section 73. Further, the reversible decoding section 62 outputs parameters of the information indicative of the inter prediction mode and motion vector information and the fisheye image information to the motion compensation section 74.

The dequantization section 63 dequantizes quantization data obtained by the decoding by the reversible decoding section 62 by a method corresponding to the quantization method of the quantization section 25 of FIG. 4 (FIG. 9). The dequantization section 63 outputs the dequantized data to the inverse orthogonal transform section 64.

The inverse orthogonal transform section 64 performs inverse orthogonal transform by the method corresponding to the orthogonal transform method of the orthogonal transform section 24 of FIG. 4 (FIG. 9) and obtains and outputs decoded residual data corresponding to residual data before the orthogonal transform by the image encoding apparatus 10 (10*a*) to the calculation section 65.

To the calculation section 65, prediction image data is supplied from the intra prediction section 73 or the motion compensation section 74. The calculation section 65 adds the decoded residual data and the prediction image data to obtain decoded image data corresponding to the original image data before the prediction image data is subtracted by the calculation section 23 of the image encoding apparatus 10. The calculation section 65 outputs the decoded image data to the deblocking filter 66.

The deblocking filter 66 performs a deblocking filter process to remove block distortion of the decoded image. The deblocking filter 66 outputs the image data after the filter process to the SAO filter 67.

The SAO filter 67 performs an SAO process for the image data after the filter by the deblocking filter 66. The SAO filter 67 performs a filter process for the image data after the filter by the deblocking filter 66 for each LCU by using the parameters supplied from the reversible decoding section 62 and outputs the resulting image data to the screen rearrangement buffer 68.

The screen rearrangement buffer 68 performs rearrangement of images. In particular, the order of frames rearranged in an encoding order by the screen rearrangement buffer 22 of FIG. 4 (FIG. 9) is changed into the original order for display.

The output of the SAO filter 67 is further supplied to the frame memory 71. The selection section 72 reads out image data to be used in intra prediction from the frame memory 71 and outputs the image data to the intra prediction section 73. Further, the selection section 72 reads out image data to be inter processed and image data to be referred to from the frame memory 71 and outputs the image data to the motion compensation section 74.

To the intra prediction section 73, pieces of information obtained by decoding header information (prediction mode information, motion vector information, reference frame information, flags, fisheye image information, various parameters and so forth) information and so forth are supplied from the reversible decoding section 62. In the case where it is decided from the information from the reversible decoding section 62 that the prediction mode is intra prediction, the intra prediction section 73 generates prediction image data from the image data acquired from the frame memory 71, on the basis of the prediction mode information and so forth, and outputs the prediction image data to the calculation section 65. Further, in the case where, in generation of prediction image data, an image of an adjacent block to a block for which an intra prediction process is to be performed is at a position outside the valid region, the intra prediction section 73 performs a padding process on the basis of the fisheye image information to replace an image of the adjacent block with an image decoded at a corresponding position in the valid region of the other reference image.

To the motion compensation section 74, information obtained by decoding header information is supplied from the reversible decoding section 62. In the case where it is indicated by the information from the reversible decoding section 62 that the prediction mode is inter prediction, the motion compensation section 74 generates prediction image data from the image data acquired from the frame memory 71, on the basis of the prediction mode information, motion vector information, reference frame information and so forth, and outputs the prediction image data to the calculation section 65. On the other hand, in the case where the image of the reference block based on the motion vector block information of a block for which motion compensation is to be performed in generation of prediction image data and the reference frame information is a position outside the valid region, the intra prediction section 73 performs a padding process on the basis of the fisheye image information to replace the image of the reference block with an image decoded already at a corresponding position in the valid region of the other fisheye image.

2-3-2. Operation of Embodiment

Figure 16:
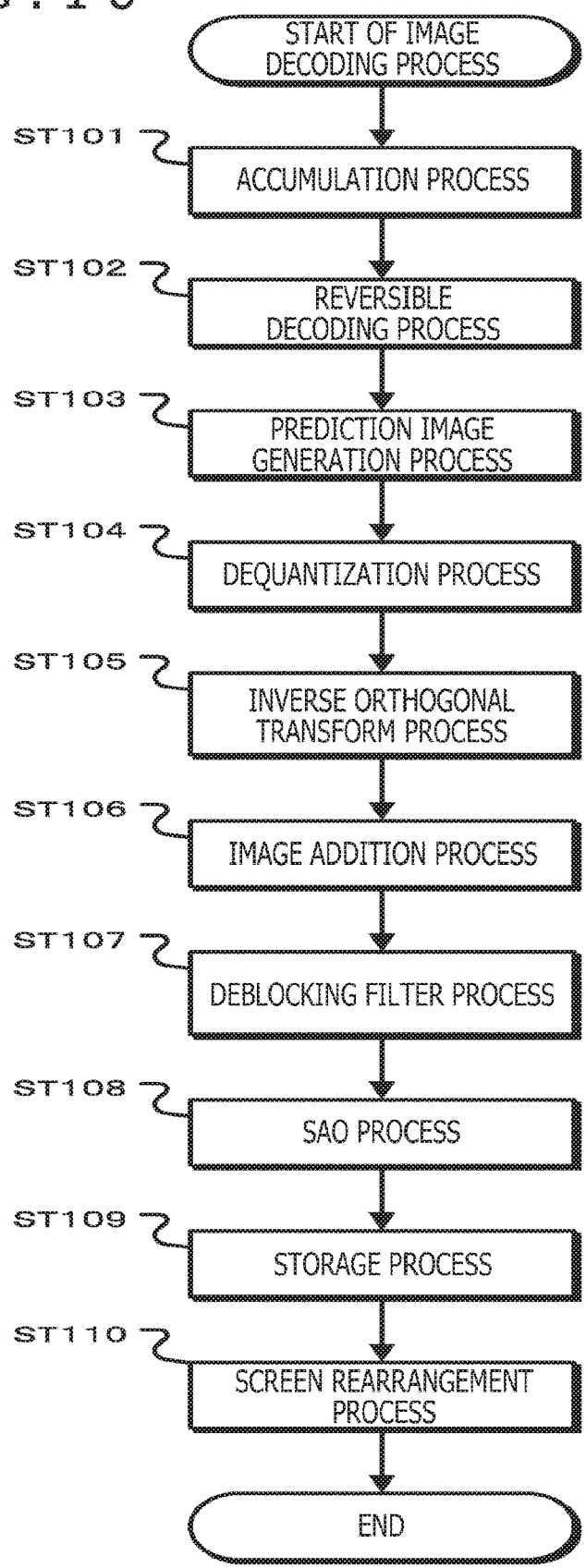
FIG. 16 is a flow chart exemplifying operation of the image decoding apparatus.

Now, operation of the embodiment of the image decoding apparatus is described. FIG. 16 is a flow chart exemplifying operation of the image decoding apparatus.

After the decoding process is started, the image decoding apparatus performs an accumulation process in step ST101. The accumulation buffer 61 of the image decoding apparatus 50 receives and accumulates an encoded stream transmitted thereto.

In step ST102, the image decoding apparatus performs a reversible decoding process. The reversible decoding section 62 of the image decoding apparatus 50 decodes an encoded stream supplied from the accumulation buffer 61. Prior to decoding of a picture, the reversible decoding section 62 decodes parameter information such as motion vector information, reference frame information, prediction mode information (intra prediction mode or inter prediction mode), and fisheye image information. In the case where the prediction mode information is intra prediction mode information, the prediction mode information and the fisheye image information are supplied to the intra prediction section 73. In the case where the prediction mode information is inter prediction mode information, motion vector information and so forth corresponding to the prediction mode information and the fisheye image information are outputted to the motion compensation section 74.

In step ST103, the image decoding apparatus performs a prediction image generation process. The intra prediction section 73 or the motion compensation section 74 of the image decoding apparatus 50 individually performs a prediction image generation process corresponding to the prediction mode information supplied from the reversible decoding section 62.

In particular, in the case where intra prediction mode information is supplied from the reversible decoding section 62, the intra prediction section 73 generates an intra prediction image of the intra prediction mode. In the case where inter prediction mode information is supplied from the reversible decoding section 62, the motion compensation section 74 performs a motion compensation process of the inter prediction mode to generate an inter prediction image. Further, the intra prediction section 73 and the motion compensation section 74 perform a padding process on the basis of fisheye image information to generate prediction images. The prediction image generated by the intra prediction section 73 (intra prediction image) or the prediction image generated by the motion compensation section 74 (inter prediction image) is outputted to the calculation section 65.

In step ST104, the image decoding apparatus performs a dequantization process. The dequantization section 63 of the image decoding apparatus 50 dequantizes the quantization data obtained by the reversible decoding section 62 by a method corresponding to the quantization method of the quantization section 25 of FIG. 4 (FIG. 9) and outputs the dequantization data to the inverse orthogonal transform section 64.

In step ST105, the image decoding apparatus performs an inverse orthogonal transform process. The inverse orthogonal transform section 64 of the image decoding apparatus 50 performs inverse orthogonal transform by a method corresponding to the orthogonal transform method of the orthogonal transform section 24 of FIG. 4 (FIG. 9) to obtain decoded residual data corresponding to residual data before the orthogonal transform in the image encoding apparatus 10 (10a), and outputs the decoded residual data to the calculation section 65.

In step ST106, the image decoding apparatus performs an image addition process. The calculation section 65 of the image decoding apparatus 50 adds the prediction image data supplied from the intra prediction section 73 or the motion compensation section 74 and the decoded residual data supplied from the inverse orthogonal transform section 64 to generate decoded image data. The calculation section 65 outputs the generated decoded image data to the deblocking filter 66 and the frame memory 71.

In step ST107, the image decoding apparatus performs a deblocking filter process. The deblocking filter 66 of the image decoding apparatus 50 performs a deblocking filter process for the image outputted from the calculation section 65. This removes block distortion. The decoded image from the deblocking filter 66 is outputted to the SAO filter 67.

In step ST108, the image decoding apparatus performs an SAO process. The SAO filter 67 of the image decoding apparatus 50 performs an SAO process for the image after the filter by the deblocking filter 66 by using parameters relating to an SAO process supplied from the reversible decoding section 62. The SAO filter 67 outputs the decoded image data after the SAO process to the screen rearrangement buffer 68 and the frame memory 71.

In step ST109, the image decoding apparatus performs a storage process. The frame memory 71 of the image decoding apparatus 50 stores the decoded image data before the filter process supplied from the calculation section 65 and the decoded image data for which the filter process by the deblocking filter 66 and the SAO filter 67 has been performed.

In step ST110, the image decoding apparatus performs a screen rearrangement process. The screen rearrangement buffer 68 of the image decoding apparatus 50 accumulates the decoded image data supplied from the SAO filter 67 and outputs the accumulated decoded image data in a displaying order that is an order before the pieces of decoded image data are rearranged by the screen rearrangement buffer 22 of the image encoding apparatus 10 (10*a*).

It is to be noted that, in regard to a two-dimensional image indicated by decoded image data, because a padding process has been performed by the image encoding apparatus, an image is sometimes displayed at a position outside the valid region of a fisheye image. Accordingly, the image decoding apparatus may be configured such that it decides a valid region of a plurality of fisheye images provided in a two-dimensional image on the basis of fisheye image information to perform a padding process of replacing an image outside the valid region of the fisheye image with an invalid image.

In such a manner, in the image decoding apparatus, since decoding of an encoded stream generated by the image encoding apparatus 10 (10*a*) described hereinabove is performed in such a manner as described hereinabove, an input image inputted to the image encoding apparatus 10 (10*a*) can be outputted from the image decoding apparatus 50. It is to be noted that the present technology can be applied not only to a case in which generation or decoding of an encoded stream compatible with the H265./HEVC standard but also to a case in which generation or decoding of an encoded stream compatible with another standard such as, for example, the standard of H.264/AVC.

3. Modification of Padding Process

In the foregoing description of the embodiment described above, the padding process is described assuming that two fisheye images have no rotation and no reversal and are fixed in terms of the continuity and the positional relation of the fisheye images. However, depending upon the configuration of the inputting section, a plurality of fisheye images is sometimes outputted as images for which a reversal process or a rotation process is performed. In this case, coordinates of a valid image to be padded are corrected from rotation information or reversal information to obtain a correct image.

Figure 17D:
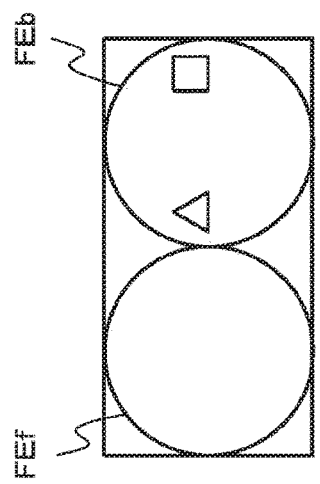
FIGS. 17A, 17B, 17C, and 17D illustrate views exemplifying a case in which a reversal process is performed.
Figure 17C:
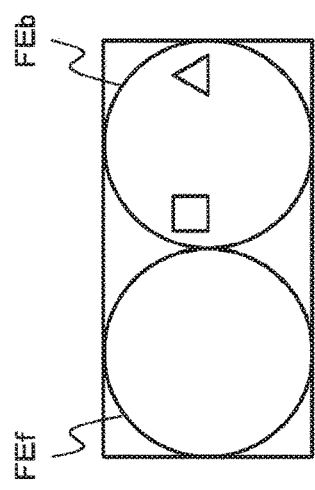
Figure 17B:
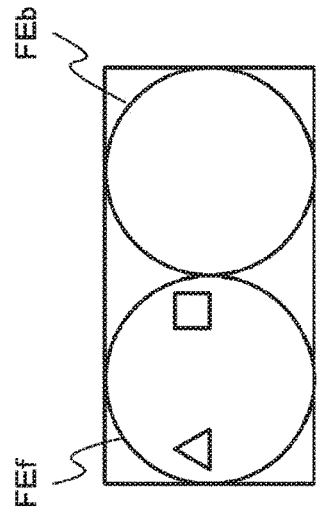
Figure 17A:
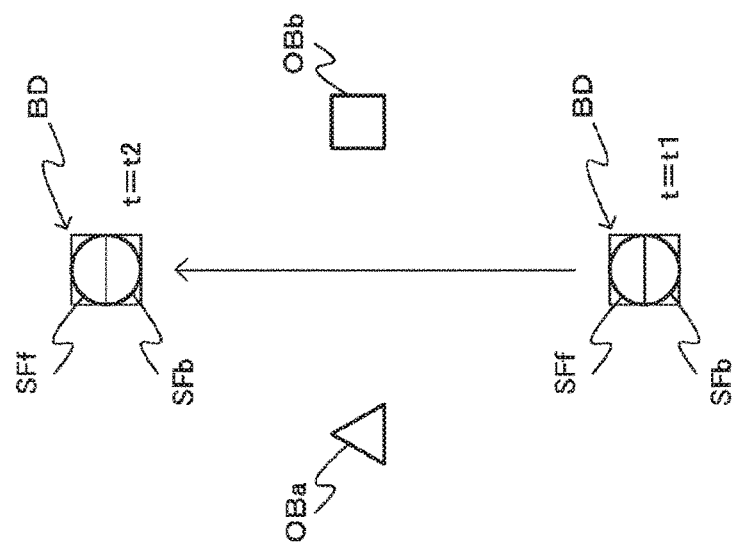

FIGS. 17A, 17B, 17C, and 17D exemplify a case in which a reversal process is performed. As depicted in FIG. 17A, for example, a fisheye image FEf by imaging of a front hemisphere SFf and a fisheye image FEb by imaging of a rear hemisphere SFb are acquired by an imaging section provided on a moving body BD. Further, an object OBa and an object OBb are provided on the left side and the right side, respectively, with respect to a route of movement of the moving body BD.

At time t1, for example, fisheye images FEf1 and FEb1 depicted in FIG. 17B are acquired by the imaging section provided on the moving body BD. Thereafter, at time t2, for example, fisheye images FEf1 and FEb1 depicted in FIG. 17C are acquired by the imaging section provided on the moving body BD. In the fisheye image FEf1 of FIG. 17B, the object OBa and the object OBb are displayed on the left side and the right side, respectively. However, in a fisheye image FEb2 of FIG. 17C, the object OBa and the object OBb are displayed on the right side and the left side, respectively. Therefore, if a reversal process is performed such that, even if the moving body BD passes the positions of the objects OBa and OBb, the display positions of the objects OBa and OBb are not reversed, then they are displayed without the reversal of the display positions of the objects OBa and OBb as depicted in FIG. 17D. In other words, by the reversal process, an object positioned on the right side can be displayed on the right side while an object positioned on the left side can be displayed on the left side.

Figure 18:
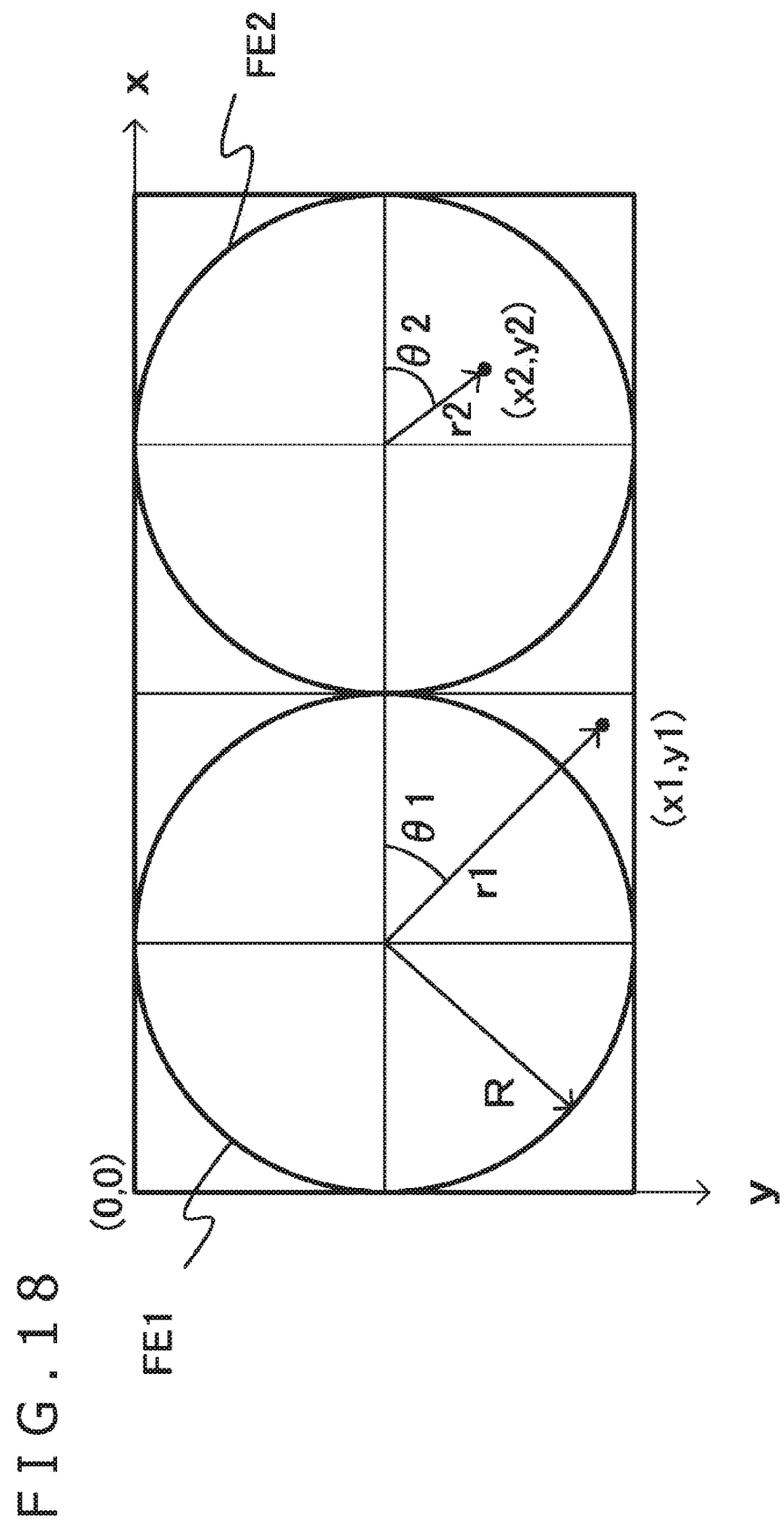
FIG. 18 is a view depicting a case in which one of two fisheye images is reversed horizontally.

FIG. 18 depicts a case in which one of two fisheye images is reversed horizontally. In this case, an expression (7) and an expression (8) are used in place of the expression (5) and the expression (6) indicated in regard to a case in which horizontal reversal is not performed, respectively. Accordingly, for the position (x1, y1) outside the valid region of the fisheye image FE1, a padding process is performed using an image at the position (x2, y2) included in the valid region of the fisheye image FE2.

$$x2 = -r2\ \cos(\theta 2) + 3R \quad (7)$$

$$y2 = r2\ \sin(\theta 2) + R \quad (8)$$

Figure 19:
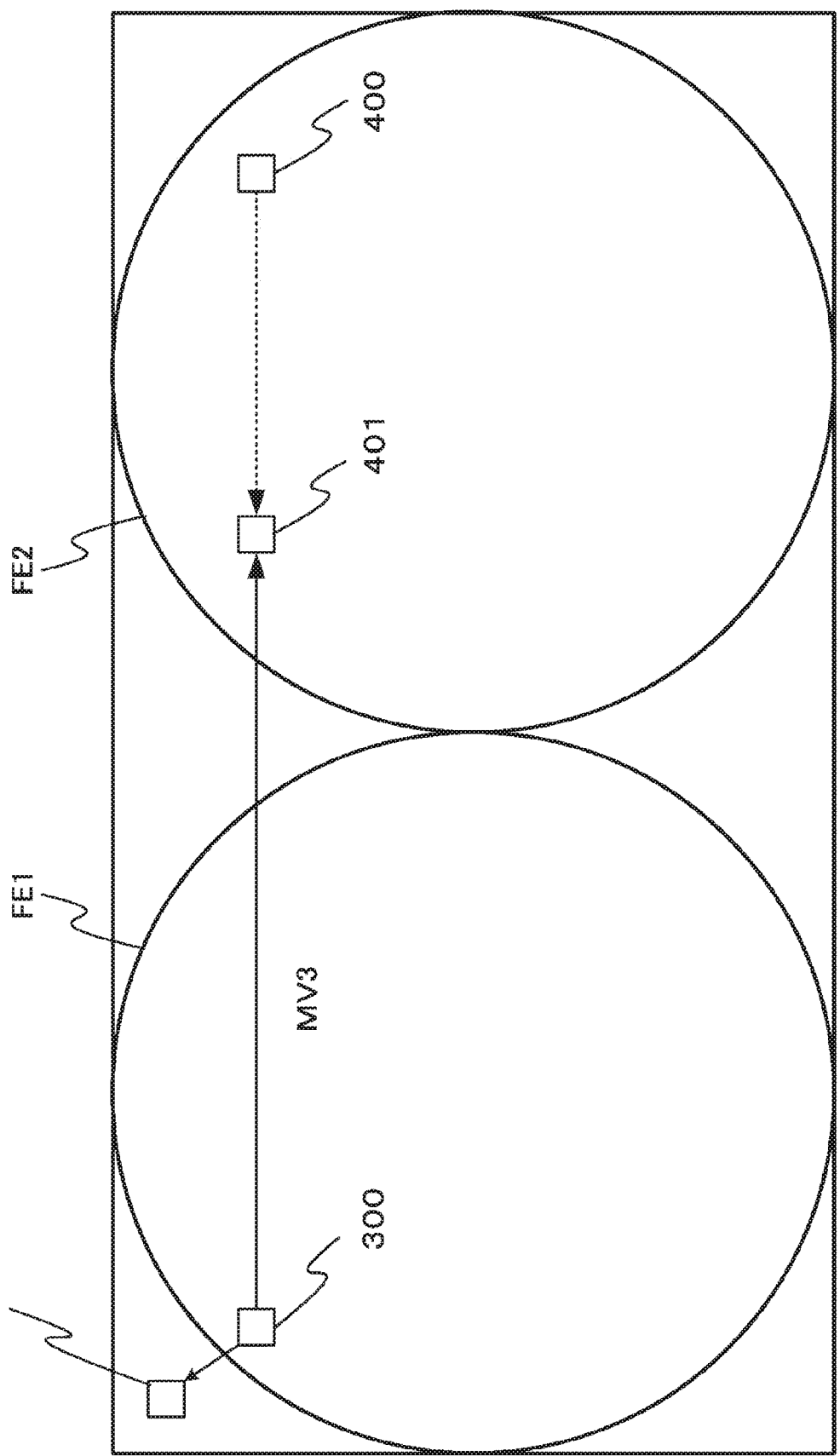
FIG. 19 is a view exemplifying a case in which a reversal process is performed in inter prediction.

FIG. 19 exemplifies a case in which a reversal process is present in inter prediction. It is to be noted that a case in which there is no reversal process corresponds to FIG. 8.

When a padding process is performed, an image within a search range outside the valid region of the fisheye image FE1 is replaced with an image at a corresponding position in the valid region of the fisheye image FE2. It is to be noted that the image at the corresponding position in the valid region of the fisheye image FE2 is an image of a block 401 at a position when a block 400 for which horizontal reversal is not performed is horizontally reversed with reference to the middle position of the fisheye image FE2. Accordingly, in the case where search for a motion vector is performed and the position at which the error from the block 300 is in the minimum is the block 301, an inter prediction process can be performed using a motion vector MV3 as an optimum motion vector.

Figure 20:
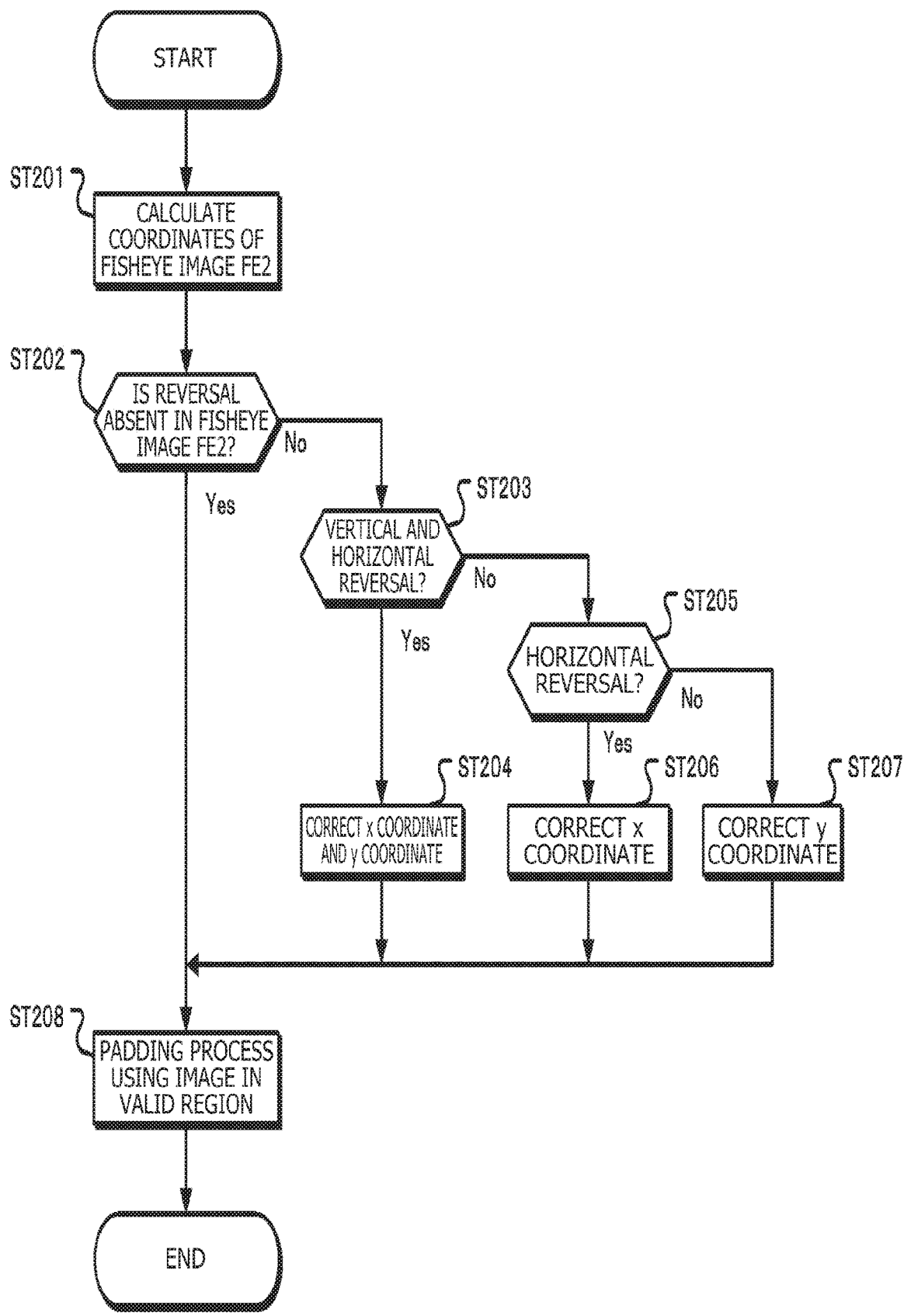
FIG. 20 is a flow chart exemplifying operation of the padding process that takes the reversal process into consideration.

FIG. 20 is a flow chart exemplifying operation of a padding process that takes a reversal process into consideration. The padding process is performed by the padding processing section 21. Otherwise, the padding process may be performed by the intra prediction section 41 and the inter prediction section 42 as described hereinabove.

In step ST201, the padding processing section calculates coordinates of the fisheye image FE2. The padding processing section 21 calculates the coordinates the fisheye image FE2 depicted in FIG. 18, on the basis of a fisheye radius R, and the processing advances to step ST202.

In step ST202, the padding processing section decides whether the fisheye image FE2 is not in a reversed state. In the case where the padding processing section 21 decides on the basis of the fisheye image information relating to the input image that the fisheye image FE2 is not in a reversed state, the processing advances to step ST208, but in the case where the padding processing section 21 decides that the fisheye image FE2 is in a reversed state, the processing advances to step ST203.

In step ST203, the padding processing section decides whether the reversal is vertical and horizontal reversal. In the case where the padding processing section 21 decides on the basis of the fisheye image information that the reversal is vertical and horizontal reversal, the processing advances to step ST204, but in the case where the padding processing section 21 decides that the reversal is not vertical and horizontal reversal, the processing advances to step ST205.

In step ST204, the padding processing section corrects the x coordinate and the y coordinate. The padding processing section 21 performs coordinate correction according to the vertical and horizontal reversal with reference to the center of the fisheye image FE2 for the x coordinate and the y coordinate. Then, the processing advances to step ST208.

In step ST205, the padding processing section decides the reversal is horizontal reversal. In the case where the padding processing section decides on the basis of the fisheye image information that horizontal reversal is performed, the processing advances to step ST206, but in the case where the padding processing section decides that the reversal is not horizontal reversal, namely, that the reversal is vertical reversal, the processing advances to step ST207.

In step ST206, the padding processing section corrects the x coordinate. The padding processing section 21 performs correction of the coordinate according to the horizontal reversal with reference to the center of the fisheye image FE2 for the x coordinate, and then the processing advances to step ST208.

In step ST207, the padding processing section corrects the y coordinate. The padding processing section 21 performs correction of the coordinate according to the vertical reversal with reference to the center of the fisheye image FE2 for the y coordinate, and the processing advances to step ST208.

In step ST208, the padding processing section performs a padding process using the image in the valid region. The padding processing section 21 replaces, on the basis, in the case where reversal is not performed, of a coordinate or coordinates that have not been corrected, but on the basis, in the case where reversal is performed, of a coordinate or coordinates after correction, an image outside the valid region in the fisheye image FE1 with an image at a corresponding position in the valid region of the fisheye image FE2. It is to be noted that, although FIG. 18 to FIG. 20 illustrate a case in which reversal of a fisheye image has been performed, also in the case where a fisheye image is in a rotated state, it is sufficient if the calculation expressions of the coordinates are changed according to rotation of a fisheye image similarly.

Now, a case in which fisheye images are different in arrangement is described as a modification of the padding process.

Figure 21B:
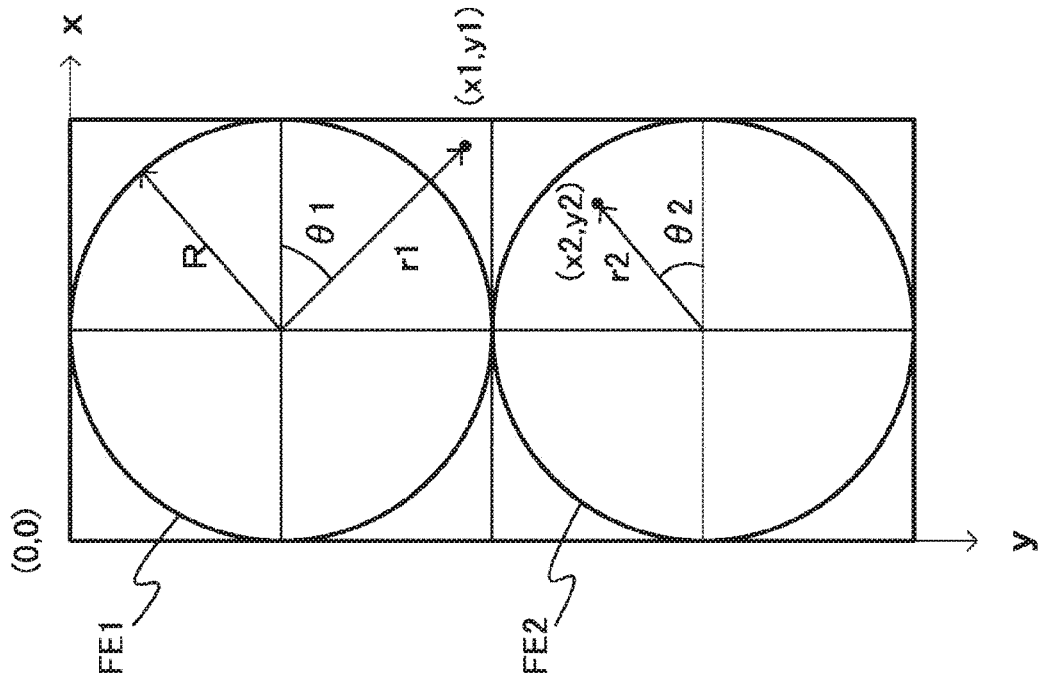
FIGS. 21A and 21B illustrate views depicting a case in which fisheye images are arranged continuously side by side in the vertical direction.
Figure 21A:
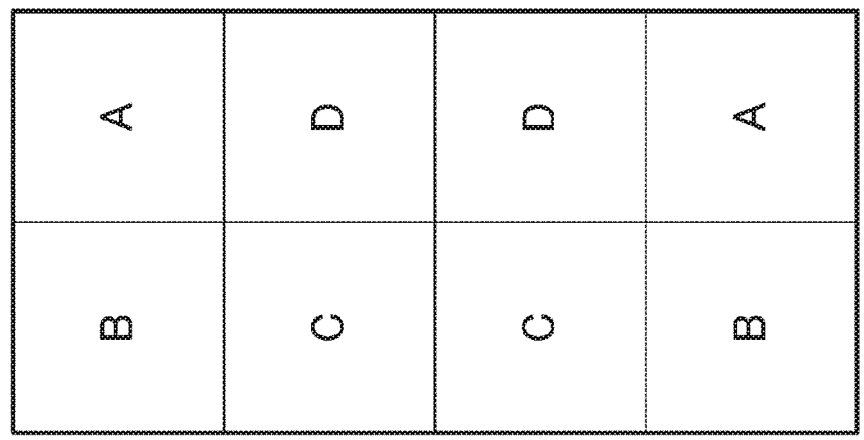

FIGS. 21A and 21B depict a case in which fisheye images are arranged side by side continuously in the vertical direction. Here, FIG. 21A depicts a relation between adjacent regions, and adjacent blocks in upper side four blocks and lower side four blocks are denoted by like reference characters A to D. FIG. 21B depicts the position of a valid region of a second fisheye image corresponding to an invalid region of a first fisheye image. In the case where the fisheye images are continuous in the vertical direction, a padding process can be performed by changing the expression (5) to expression (7) given hereinabove for the case where they are arranged side by side horizontally to an expression (9) to an expression (11), respectively.

$$\theta 2 = -\theta 1 \tag{9}$$

$$x2 = r2\ \cos(\theta 2) + R \tag{10}$$

$$y2 = r2\ \sin(\theta 2) + 3R \tag{11}$$

FIG. 22 depicts a case in which three fisheye images are arranged side by side continuously in the horizontal direction. In this case, if an offset in the horizontal direction is added to the padding process of the fisheye image FE1 and the fisheye image FE2, then expansion to a padding process of the fisheye image FE2 and a fisheye image FE3 can be achieved. In other words, as an image outside the valid region of the fisheye image FE2, an image at a corresponding position in the valid region of the fisheye image FE3 can be used.

Figure 23:
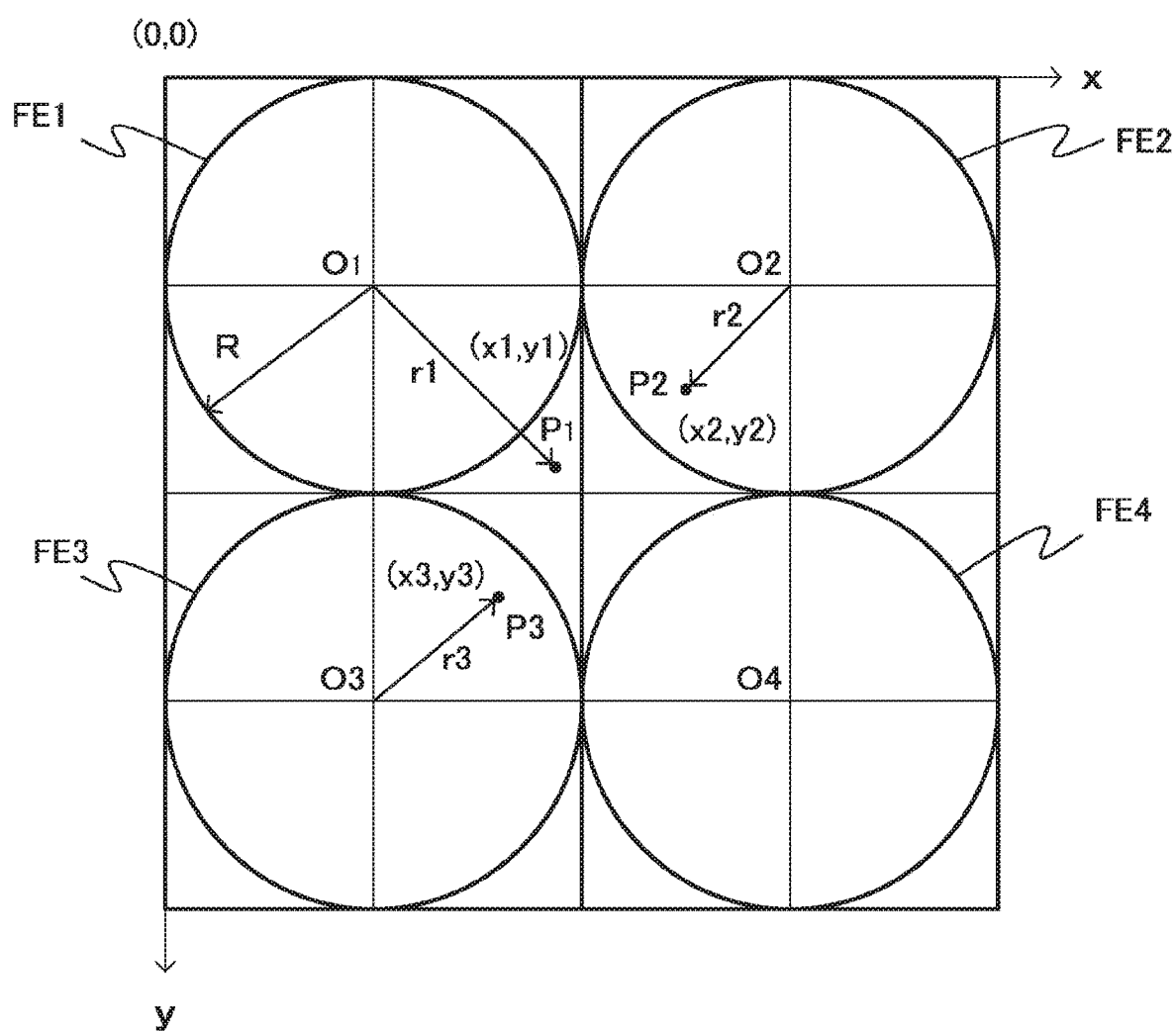
FIG. 23 is a view depicting a case in which four fisheye images are arranged side by side.

FIG. 23 depicts a case in which four fisheye images are arranged side by side. In the case where four fisheye images are concerned, image choices for valid regions that can be utilized in a padding process increase. A position outside a valid region of a fisheye image sometimes corresponds to a position of a valid region of a plurality of other fisheye images. For example, a position P1 (coordinates (x1, y1)) outside the valid region of the fisheye image FE1 corresponds to a position P2 (coordinates (x2, y2)) of the valid region of the fisheye image FE2 and a position P3 (coordinates (x3, y3)) of the valid region of the fisheye image FE3. In the case where a position outside the valid region of the fisheye image FE1 corresponds to positions that are present in a plurality of other fisheye images in such a manner, the padding processing section 21 adds a process for determining the image in which one of the fisheye images is to be used.

For a determination method of a fisheye image to be used in the padding process, for example, the distance from the center of the fisheye image is used. According to the method of using the distance from the center of a fisheye image, the distance from a padding target position outside the valid region of a fisheye image to the center of a fisheye image in which a position corresponding to the padding target position exists in the valid region thereof is calculated for each of the other fisheye images, and the image of the position corresponding to the valid region in the fisheye image having the shortest distance is used.

Figure 24:
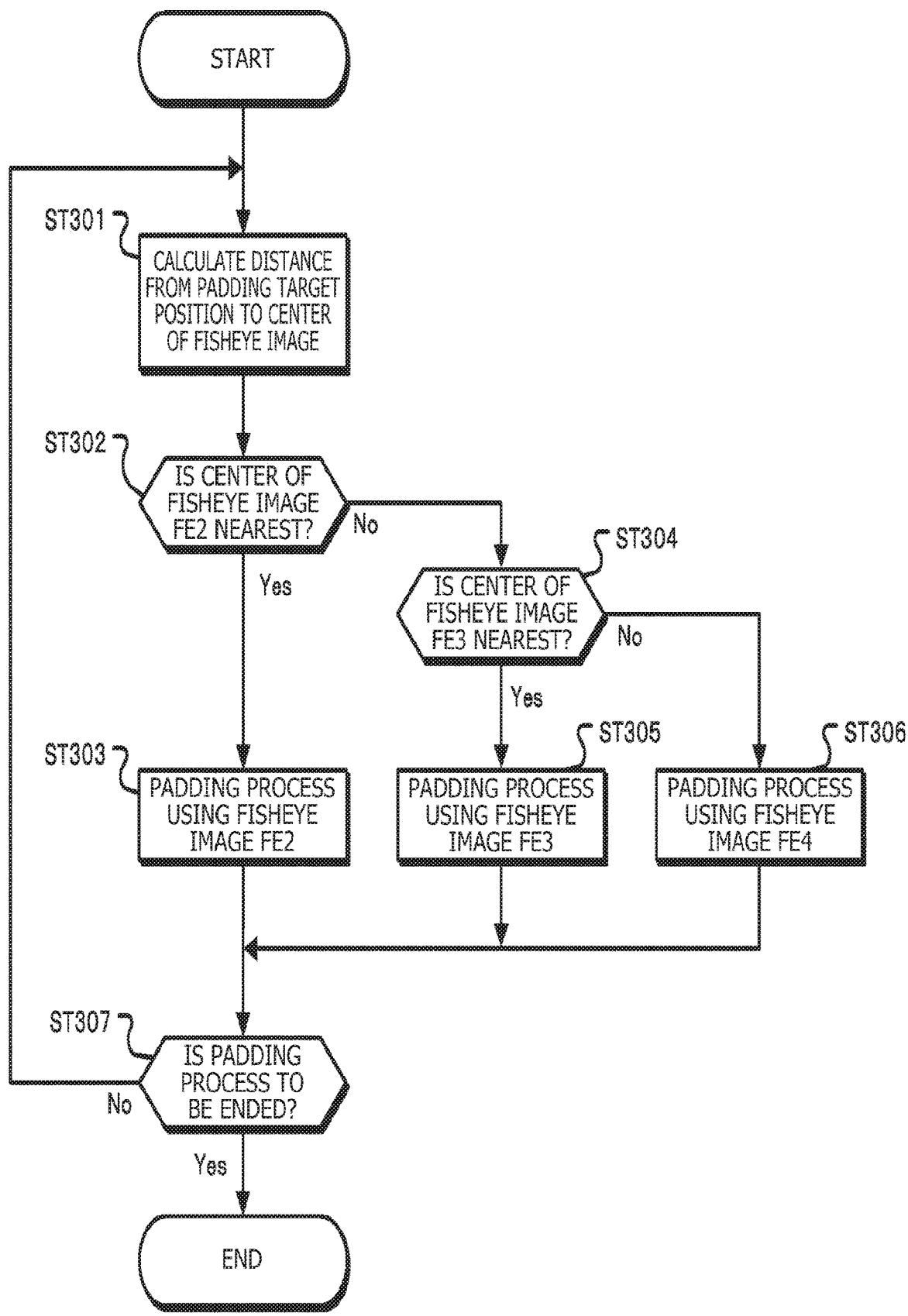
FIG. 24 is a flow chart exemplifying operation of a padding process that utilizes a distance from a center of a fisheye image.

FIG. 24 is a flow chart exemplifying operation of a padding process that uses a distance from the center of a fisheye image and illustrates operation in the case where fisheye images in which a position corresponding to a padding target position exists in a valid region thereof are fisheye images FE2, FE3, and FE4.

In step ST301, the padding processing section calculates the distance from a padding target position to the center of the fisheye image. The padding processing section 21 calculates the distance from the padding target position outside the valid region in the fisheye image FE1 to the center of each of the other fisheye images FE2, FE3, and FE4, and then, the processing advances to step ST302.

In step ST302, the padding processing section decides whether the center of the fisheye image FE2 is nearest. In the case where the distance to the center of the fisheye image FE2 is shortest on the basis of the distances calculated in step ST301, the padding processing section 21 decides that the center of the fisheye image FE2 is nearest, and the processing advances to step ST303. On the other hand, in the case where the shortest distance is not the distance to the center of the fisheye image FE2, the processing advances to step ST304.

In step ST303, the padding processing section performs a padding process using the fisheye image FE2. The padding processing section 21 replaces the image of the padding target position outside the valid region in the fisheye image FE1 with an image at a corresponding position in the valid region of the fisheye image FE2, and then the processing advances to step ST307.

In step ST304, the padding processing section decides whether the center of the fisheye image FE3 is nearest. In the case where the distance to the center of the fisheye image FE3 is shortest on the basis of the distances calculated in step ST301, the padding processing section 21 decides that the center of the fisheye image FE3 is nearest, and the processing advances to step ST305. On the other hand, in the case where the shortest distance is not the distances to the centers of the fisheye images FE2 and FE3, the processing advances to step ST306.

In step ST305, the padding processing section performs a padding process using the fisheye image FE3. The padding processing section 21 replaces the image at the padding target position outside the valid region of the fisheye image FE1 with an image at a corresponding position of the valid region in the fisheye image FE3, and the processing advances to step ST307.

In step ST306, the padding processing section performs a padding process using the fisheye image FE4. The padding processing section 21 replaces the image of the padding target position outside the valid region in the fisheye image FE1 with the image at the corresponding position in the valid region of the fisheye image FE4, and the processing advances to step ST307.

In step ST307, the padding processing section decides whether the padding process is to be ended. In the case where the padding processing section 21 has replaced the images at all padding target positions with images in the valid region of the other fisheye image, it ends the padding process. On the other hand, in the case where there remains a padding target position for which the padding process has not been performed, the padding processing section 21 sets a new padding target position, and the processing returns to step ST301.

If such processes as described above are performed, even if a plurality of fisheye images includes a position corresponding to the padding target position in the valid region thereof, a fisheye image to be used for the padding process can be selected.

It is to be noted that, although the padding process described above exemplifies a case in which an image outside the valid region of the fisheye image FE1 is replaced with an image at a corresponding position of a valid region of another fisheye image, also in the case where an image different from the fisheye image FE1, for example, an image outside the valid region of the fisheye image FE2, is to be replaced with an image at a corresponding position in the valid region of another fisheye image, it is sufficient if a padding process is performed similarly to the image outside the valid region of the fisheye image FE1.

Further, while the padding process described above exemplifies a case in which a plurality of fisheye images configuring 360 degrees in all directions is used, it is sufficient if a plurality of fisheye images configures a predetermined azimuth range, and this is not limited to 360 degrees in all directions.

4. Application Examples

Now, application examples of the image processing apparatus of the present technology are described. The image processing apparatus of the present technology can be applied, for example, to an imaging apparatus that captures a moving image using a fisheye lens. In this case, if the image encoding apparatus 10 (10a) is provided in the imaging apparatus, then the encoding efficiency of a fisheye image is enhanced to allow the imaging apparatus to record an encoded stream on a recording medium or output an encoded stream to external equipment. On the other hand, if the image decoding apparatus 50 is provided in an imaging apparatus, then the imaging apparatus can decode an encoded stream to perform recording and reproduction of a fisheye image. Further, if an imaging apparatus that includes the image encoding apparatus 10 (10a) is incorporated in a moving body of any of types such as, for example, an automobile, an electric automobile, a hybrid electric automobile, a motorcycle, a bicycle, a personal mobility, an airplane, a drone, a ship, a robot, a construction machine, and an agricultural machine (a tractor and so forth), then it becomes possible to record or transmit an image of the entire surroundings of the moving body efficiently to external equipment. Furthermore, if the image processing apparatus of the present technology is provided in a portable electronic apparatus having a function of capturing a moving image using a fisheye lens, then when a fisheye image is to be recorded on a recording medium, the data amount can be reduced in comparison with that in an alternative case in which a padding process is not performed.

Further, if the image processing apparatus that performs a decoding process is provided in an image reproduction apparatus, then it becomes possible to display an omnidirectional image on a head-mounted display or the like.

The series of processes described in the specification can be executed by hardware, software, or a composite configuration of them. In the case where the processes by software are to be executed, a program in which the processing sequence is described is installed into a memory in and executed by a computer incorporated in hardware for exclusive use. Alternatively, the program can be installed into and executed by a computer for universal use that can execute various processes.

For example, the program can be recorded into a hard disk, an SSD (Solid State Drive), or a ROM (Read Only Memory) as a recording medium in advance. Alternatively, the program can be stored (recorded) temporarily or non-transitorily in a removable recording medium such as a flexible disk, a CD-ROM (Compact Disc Read Only Memory), an MO (Magneto optical) disk, a DVD (Digital Versatile Disc), a BD (Blu-Ray Disc (registered trademark)), a magnetic disk, or a semiconductor memory card. Such a removable recording medium as just described can be provided as what is generally called package software.

Further, the program may be installed into a computer from a removable recording medium or may be transferred to a computer by wireless or wired transfer from a download site through a network such as a LAN (Local Area Network) or the Internet. The computer can receive the program transferred in such a manner and install the program into a recording medium such as a hard disk built therein.

It is to be noted that the effects described in the present specification are exemplary to the last and are not restrictive and additional effects that are not described may be applicable. Further, the present technology shall not be interpreted restrictively to the embodiments of the technology described above. The embodiments of the present technology disclose the present technology by way of exemplification and it is obvious that those skilled in the art can perform modification of and substitution in the embodiments without departing from the subject matter of the present technology. In other words, in order to decide the subject matter of the present technology, the claims should be taken into consideration.

It is to be noted that the image processing apparatus of the present technology can also take such a configuration as described below.

(1)
An image processing apparatus, including:
a padding processing section configured to perform, by using a two-dimensional image in which plural fisheye images configuring a predetermined azimuth range are provided side by side, a padding process of replacing an image at a position outside a valid region of a fisheye image with an image at a corresponding position in a valid region of another fisheye image on the basis of continuity of the plural fisheye images.

(2)
The image processing apparatus according to (1), in which the padding processing section replaces an image at a position to be used in a prediction process outside the valid region of the fisheye image with an image at the corresponding position.

(3)
The image processing apparatus according to (1) or (2), in which
the valid region of the fisheye image is a region within a fisheye radius.

(4)
The image processing apparatus according to (3), in which
the padding processing section calculates the position in the valid region of the another fisheye image corresponding to the position outside the valid region according to the fisheye radius and an arrangement state of the plural fisheye images. (5)
The image processing apparatus according to (3) or (4), in which
the padding processing section calculates the position in the valid region of the another fisheye image corresponding to the position outside the valid region according to reversal or rotation for each fisheye image.

(6)
The image processing apparatus according to any one of (3) to (5), in which,
in a case where each of a plurality of fisheye images includes the corresponding position in the valid region of the fisheye images, the padding processing section performs replacement using an image of a fisheye image in which a distance from a fisheye center of the fisheye image that includes the corresponding position in the valid region of the fisheye image to the position outside the valid region for which the padding process is to be performed is shortest.

(7)
The image processing apparatus according to any one of (1) to (6), further including:
an encoding section configured to perform a prediction encoding process of the two-dimensional image to generate an encoded stream, in which
the encoding section performs the prediction encoding process using an image for which the padding process has been performed.

(8)
The image processing apparatus according to (7), in which
the encoding section performs a quantization process and a prediction process using the two-dimensional image for which the padding process has been performed.

(9)
The image processing apparatus according to (8), in which
the encoding section performs the padding process for an image that is an adjacent block of an intra prediction process outside the valid region of the fisheye image or an image that is a search range for a motion vector in an inter prediction process.

(10)
The image processing apparatus according to (7), in which the encoding section performs a prediction process using the two-dimensional image before the padding process is performed, and
the padding processing section performs the padding process when an image of an adjacent block to a block for which the intra prediction process is to be performed or an image of a search range for a motion vector in a block for which the inter prediction process is to be performed is outside the valid region.

(11)
The image processing apparatus according to any one of (7) to (10), in which
the encoding section includes fisheye image information relating to the fisheye images provided in the two-dimensional image into the encoded stream.

(12)
The image processing apparatus according to (11), in which
the fisheye image information includes information indicative, for each of the fisheye images, of a center position of each of the fisheye images in the two-dimensional image, a fisheye radius, and a state of reversal or rotation for each fisheye image.

(13)
The image processing apparatus according to any one of (1) to (6), further including:
a decoding section configured to decode an encoded stream generated by performing a prediction encoding process of the two-dimensional image, in which
the decoding section replaces, where an image to be used in the prediction process is at a position outside the valid region, the image to be used in the prediction process with an image after decoding at a corresponding position in the valid region of the another fisheye image.

(14)
The image processing apparatus according to (13), in which
the image to be used in the prediction process includes an image of an adjacent block to a block for which the intra prediction process is to be performed or an image of a reference block based on motion vector information of a block for which motion compensation is to be performed and reference frame information.

(15)

The image processing apparatus according to (13) or (14), in which the encoded stream includes fisheye image information relating to the fisheye images provided in the two-dimensional image, and the decoding section calculates the corresponding position in the valid region of the another fisheye image on the basis of the fisheye image information obtained by decoding the encoded stream.

(16)

The image processing apparatus according to any one of (13) to (15), in which the decoding section replaces an image outside the valid region of the fisheye images in the two-dimensional image after decoding with an invalid image.

INDUSTRIAL APPLICABILITY

According to the image processing apparatus and the image processing method of the present technology, a two-dimensional image in which plural fisheye images configuring a predetermined azimuth range are provided side by side is used to perform a padding process of replacing, on the basis of the continuity of the plural fisheye images, an image at a position outside a valid region of a fisheye image with an image at a corresponding position in a valid region of another fisheye image. Therefore, even if an image to be used in prediction is a position outside the valid region, it is replaced with an image at a corresponding position in the valid region. Thus, the encoding efficiency of a two-dimensional image in which plural fisheye images are provided side by side can be increased. Accordingly, the image processing apparatus and the image processing method are suitable for electronic equipment, a mobile apparatus and so forth that perform recording, reproduction, transmission or the like of fisheye images.

REFERENCE SIGNS LIST 10, 10a . . . Image encoding apparatus
21 . . . Padding processing section
22, 68 . . . Screen rearrangement buffer
23, 33, 65 . . . Calculation section
24 . . . Orthogonal transform section
25 . . . Quantization section
26 . . . Reversible encoding section
27, 61 . . . Accumulation buffer
28 . . . Rate controlling section
31, 63 . . . Dequantization section
32, 64 . . . Inverse orthogonal transform section
34, 66 . . . Deblocking filter
35, 67 . . . SAO filter
36, 71 . . . Frame memory
37, 72 . . . Selection section
41, 41a, 73 . . . Intra prediction section
42, 42a . . . Inter prediction section
43 . . . Prediction selection section
50 . . . Image decoding apparatus
62 . . . Reversible decoding section
74 . . . Motion compensation section

The invention claimed is:

1. An image processing apparatus, comprising:
a padding processing section configured to perform, by using a two-dimensional image in which plural fisheye images configuring a determined azimuth range are provided side by side, a padding process to replace an image at a position outside a valid region of a first fisheye image with an image at a corresponding position in a valid region of a second fisheye image based on continuity of the plural fisheye images, wherein based on the position outside the valid region of the first fisheye image that corresponds to positions included in each of the plural fisheye images, the padding processing section is further configured to perform replacement using a fisheye image of the plural fisheye images in which a distance from a fisheye center of the fisheye image that includes the corresponding position in the valid region of the plural fisheye images to the position outside the valid region of the first fisheye image for which the padding process is to be performed is shortest.

2. The image processing apparatus according to claim 1, wherein the padding processing section is further configured to replace an image at a position to be used in a prediction process outside the valid region of the first fisheye image with an image at the corresponding position in the valid region of the second fisheye image.

3. The image processing apparatus according to claim 1, wherein the valid region of the first fisheye image and the valid region of the second fisheye image is a region within a fisheye radius.

4. The image processing apparatus according to claim 3, wherein the padding processing section is further configured to calculate the position in the valid region of the second fisheye image corresponding to the position outside the valid region based on the fisheye radius and an arrangement state of the plural fisheye images.

5. The image processing apparatus according to claim 3, wherein the padding processing section is further configured to calculate the position in the valid region of the second fisheye image corresponding to the position outside the valid region based on reversal or rotation for each fisheye image of the plural fisheye images.

6. The image processing apparatus according to claim 1, further comprising:

an encoding section configured to perform a prediction encoding process of the two-dimensional image to generate an encoded stream, wherein the encoding section is further configured to perform the prediction encoding process based on an image for which the padding process has been performed.

7. The image processing apparatus according to claim 6, wherein the encoding section is further configured to perform a quantization process and a prediction process based on the two-dimensional image for which the padding process has been performed.

8. The image processing apparatus according to claim 7, wherein the encoding section is further configured to perform the padding process for an image that is an adjacent block of an intra prediction process outside the valid region of the first fisheye image or an image that is a search range for a motion vector in an inter prediction process.

9. The image processing apparatus according to claim 6, wherein the encoding section is further configured to perform a prediction process using the two-dimensional image before the padding process is performed, and the padding processing section is further configured to perform the padding process based on an image of an adjacent block to a block for which an intra prediction process is to be performed or an image of a search range for a motion vector in a block for which an inter prediction process is to be performed is outside the valid region.

10. The image processing apparatus according to claim 6, wherein
the encoding section includes fisheye image information related to the plural fisheye images provided in the two-dimensional image into the encoded stream.

11. The image processing apparatus according to claim 10, wherein
the fisheye image information includes information indicative, for each of the plural fisheye images, of a center position of each of the plural fisheye images in the two-dimensional image, a fisheye radius, and a state of reversal or rotation for each fisheye image of the plural fisheye images.

12. The image processing apparatus according to claim 1, further comprising:
a decoding section configured to:
decode an encoded stream generated based on a prediction encoding process of the two-dimensional image; and
replace, where an image to be used in a prediction process is at a position outside the valid region of the first fisheye image, the image to be used in the prediction process with a decoded image at a corresponding position in the valid region of the second fisheye image.

13. The image processing apparatus according to claim 12, wherein
the image to be used in the prediction process includes an image of an adjacent block to a block for which an intra prediction process is to be performed or an image of a reference block based on motion vector information of a block for which motion compensation is to be performed and reference frame information.

14. The image processing apparatus according to claim 12, wherein
the encoded stream includes fisheye image information relating to the plural fisheye images provided in the two-dimensional image, and
the decoding section is further configured to calculate the corresponding position in the valid region of the second fisheye image based on the fisheye image information obtained based on the decoded encoded stream.

15. The image processing apparatus according to claim 12, wherein
the decoding section is further configured to replace an image outside the valid region of the plural fisheye images in the two-dimensional image after decode with an invalid image.

16. An image processing method, comprising:
replacing in a padding processing section, by using a two-dimensional image in which plural fisheye images configuring a determined azimuth range are provided side by side, an image at a position outside a valid region of a first fisheye image with an image at a corresponding position in a valid region of a second fisheye image based on continuity of the plural fisheye images, wherein
based on the position outside the valid region of the first fisheye image corresponding to positions included in each of the plural fisheye images, the replacing in the padding processing section includes replacement using a fisheye image of the plural fisheye images in which a distance from a fisheye center of the fisheye image that includes the corresponding position in the valid region of the plural fisheye images to the position outside the valid region of the first fisheye image is shortest.

* * * * *